United States Patent
McChord et al.

(10) Patent No.: US 10,404,521 B2
(45) Date of Patent: Sep. 3, 2019

(54) REMOTELY CONFIGURABLE ROUTERS WITH FAILOVER FEATURES, AND METHODS AND APPARATUS FOR RELIABLE WEB-BASED ADMINISTRATION OF SAME

(71) Applicant: Datto, Inc., Norwalk, CT (US)

(72) Inventors: Austin McChord, Norwalk, CT (US); Evan Anthony Buther, Norwalk, CT (US); Daniel Charles Fuhry, Weston, CT (US); Robert John Gibbons, Jr., Norwalk, CT (US); William Moon, Penfield, NY (US)

(73) Assignee: Datto, Inc., Norwalk, CT (US)

( * ) Notice: Subject to any disclaimer, the term of this patent is extended or adjusted under 35 U.S.C. 154(b) by 0 days.

(21) Appl. No.: 15/543,445

(22) PCT Filed: Jan. 14, 2016

(86) PCT No.: PCT/US2016/013494
§ 371 (c)(1),
(2) Date: Jul. 13, 2017

(87) PCT Pub. No.: WO2016/115409
PCT Pub. Date: Jul. 21, 2016

(65) Prior Publication Data
US 2018/0006870 A1  Jan. 4, 2018

Related U.S. Application Data

(60) Provisional application No. 62/103,447, filed on Jan. 14, 2015.

(51) Int. Cl.
*G06F 13/00* (2006.01)
*H04L 29/14* (2006.01)
(Continued)

(52) U.S. Cl.
CPC .............. *H04L 29/14* (2013.01); *G06F 11/20* (2013.01); *H04L 12/413* (2013.01); *H04L 12/46* (2013.01);
(Continued)

(58) Field of Classification Search
CPC ........ H04L 12/46; H04L 29/14; H04L 69/18; H04L 69/40; H04L 43/10; H04L 12/4641;
(Continued)

(56) References Cited

U.S. PATENT DOCUMENTS

| 6,032,266 A | 2/2000 | Ichinohe et al. |
| 7,139,926 B1 * | 11/2006 | Madhav ................ G06F 9/5033 714/4.11 |

(Continued)

OTHER PUBLICATIONS

International Search Report and Written Opinion for International Application No. PCT/US2016/013494 dated Jun. 3, 2016 (25 pages).

*Primary Examiner* — Kenneth R Coulter
(74) *Attorney, Agent, or Firm* — Wilmer Cutler Pickering Hale and Dorr LLP

(57) ABSTRACT

Web-enabled routers are remotely and securely administered in a centralized fashion. A router receives a configuration profile from a dedicated web domain that maintains a repository of configuration profiles for multiple routers. The web domain also provides a web portal for customized generation of new configuration profiles based on stored profiles. When a new profile is deployed to and instantiated on a router, the router transmits a "heartbeat" to ensure that it can maintain connectivity with the web domain; if not, the router reverts to a previous "failover" configuration profile that ensures connectivity to the web domain. A router also may be equipped with both a wired and a wireless (e.g., a 3G, 4G, or 4G LTE) WAN communication interface. In the event of a wired connectivity issue, the router controls the wireless WAN interface to prioritize traffic for the router heartbeat and data backup/restore operations between a computer network for which the router serves as a gateway and the web domain.

18 Claims, 32 Drawing Sheets

(51) Int. Cl.
*H04L 12/46* (2006.01)
*H04L 29/06* (2006.01)
*G06F 11/20* (2006.01)
*H04L 12/413* (2006.01)
*H04L 12/24* (2006.01)
*H04L 12/26* (2006.01)

(52) U.S. Cl.
CPC ...... *H04L 12/4625* (2013.01); *H04L 12/4641* (2013.01); *H04L 41/0806* (2013.01); *H04L 43/0811* (2013.01); *H04L 43/10* (2013.01); *H04L 69/18* (2013.01); *H04L 69/40* (2013.01)

(58) Field of Classification Search
CPC ............. H04L 12/4625; H04L 41/0806; H04L 43/0811; H04L 12/413; G06F 11/20
USPC ........ 709/220–222, 224, 223, 203; 370/254; 726/11, 12; 714/4.1, 4.11
See application file for complete search history.

(56) References Cited

U.S. PATENT DOCUMENTS

| | | | |
|---|---|---|---|
| 7,657,871 B2* | 2/2010 | Velupillai | H04L 41/0681 717/121 |
| 7,953,883 B2 | 5/2011 | Thomas et al. | |
| 8,432,701 B2 | 4/2013 | Katano | |
| 8,806,032 B2* | 8/2014 | Van der Merwe | H04L 69/16 709/227 |
| 2003/0165144 A1* | 9/2003 | Wang | H04L 45/00 370/400 |
| 2003/0198182 A1 | 10/2003 | Pegrum et al. | |
| 2005/0138204 A1 | 6/2005 | Iyer et al. | |
| 2007/0022418 A1* | 1/2007 | Velupillai | H04L 41/0681 717/168 |
| 2011/0010560 A1 | 1/2011 | Etchegoyen | |
| 2012/0158976 A1* | 6/2012 | Van der Merwe | H04L 45/02 709/228 |
| 2014/0119176 A1 | 5/2014 | Cirkovic et al. | |
| 2014/0247708 A1 | 9/2014 | Knox | |

\* cited by examiner

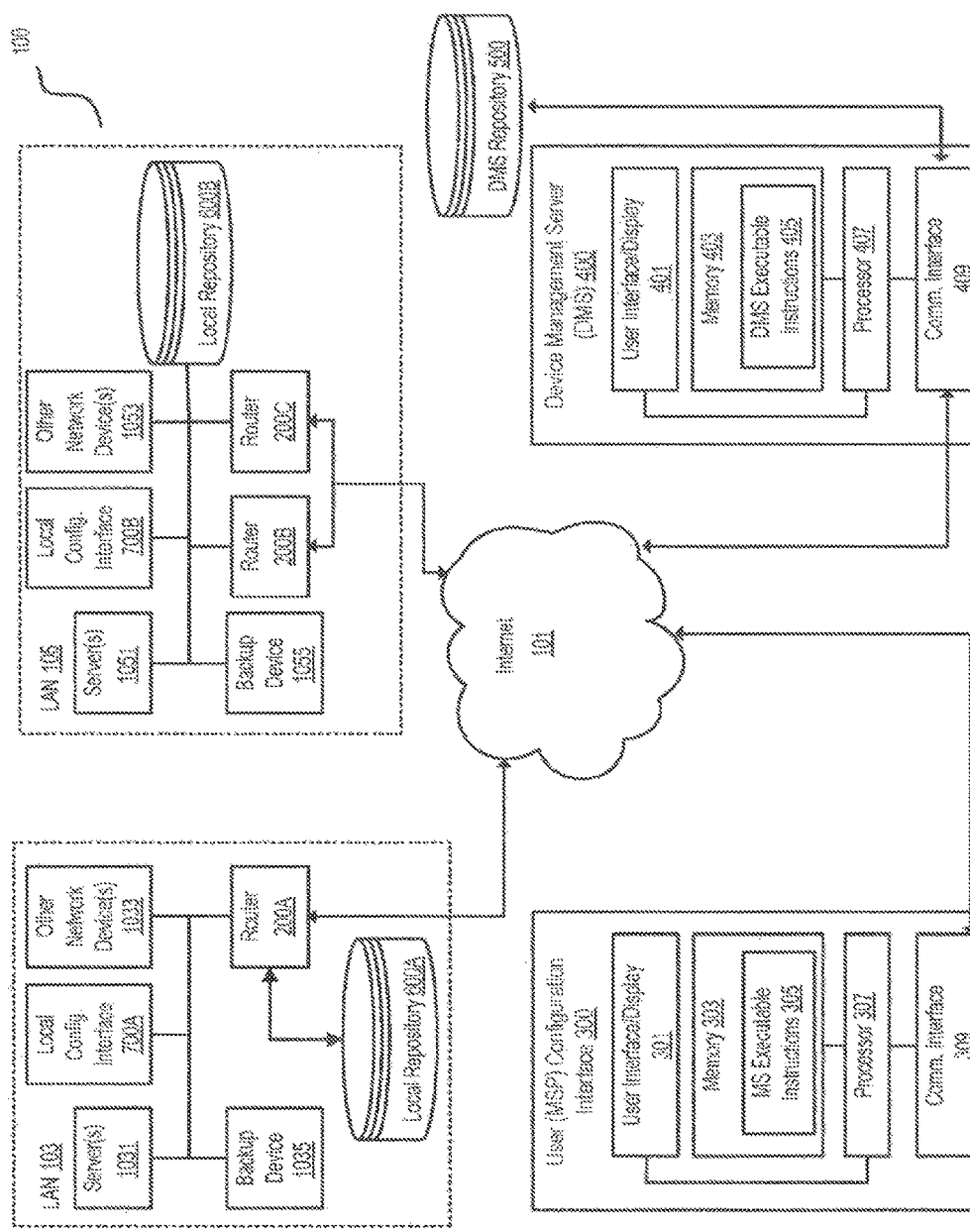

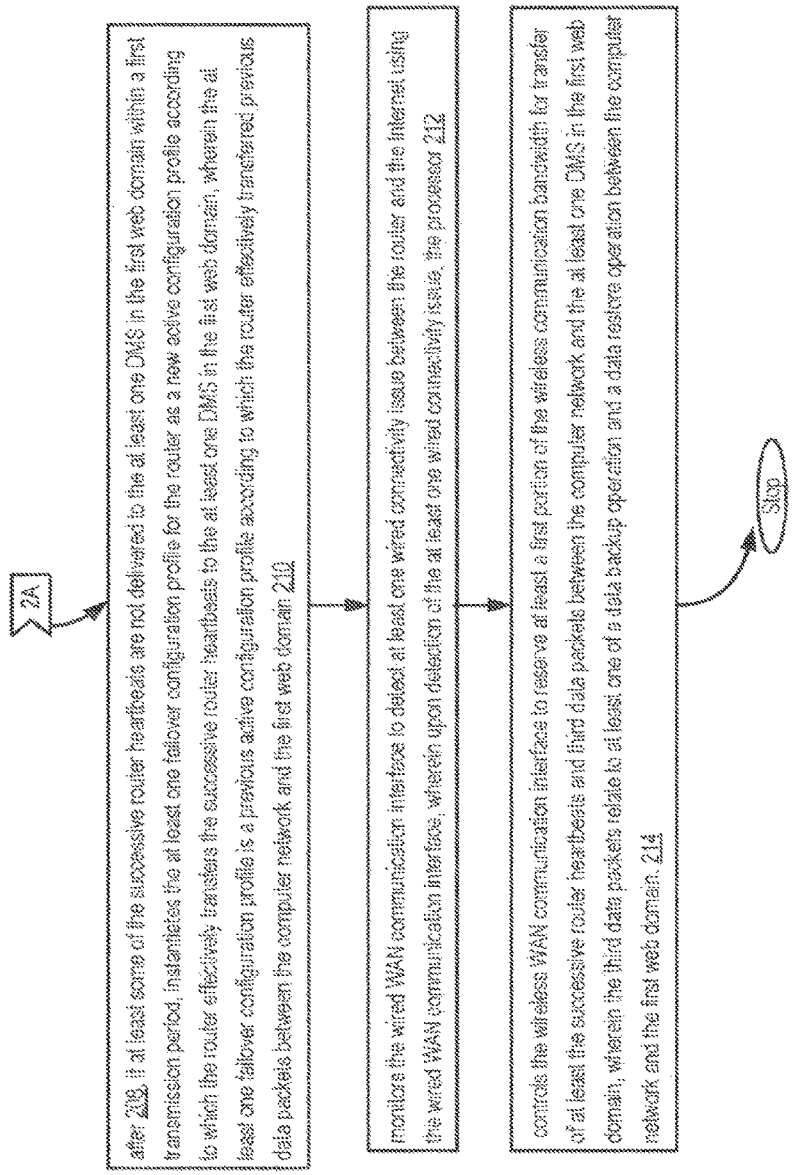
Fig. 2B  Example: A web-enabled router to facilitate transfer of data packets between the Internet and a computer network Fig. 12  Example Logic Flow: Router configuration via a smart template, e.g., TBC Component 1200

Fig. 13 — Example: Reliable router configuration internal process, e.g., ICONF Component 1300

Fig. 14   Example: Reliable transmission of a synchronous check-in heartbeat packet, e.g., SCHK Component 1400

Fig. 15  Example: Monitoring and remote recovery of a malfunctioning web-based router, e.g., MRR Component 1500

Example User interface to configure a local area network of a web-enabled router via a smart template Example: User interface showing the detection of a user input error during the configuration of a local area network in a web-enabled router.

Fig. 21 Example Logic Flow: User interface to select a range of IP addresses for a Dynamic Host Configuration Protocol (DHCP) pool in a web-enabled router Fig. 22 Example: User interface to set a message with terms of service to be displayed on client devices connected to a guest network of the web-enabled router Example: A MSP user interface for an assisted configuration of a local area network in a web-enabled router

REMOTELY CONFIGURABLE ROUTERS WITH FAILOVER FEATURES, AND METHODS AND APPARATUS FOR RELIABLE WEB-BASED ADMINISTRATION OF SAME

CROSS-REFERENCES TO RELATED APPLICATIONS

This application is a national stage application of International Application No. PCT/US2016/0013494, entitled "Remotely Configurable Routers with Failover Features, and Methods and Apparatus for Reliable Web-Based Administration of Same," filed Jan. 14, 2016, which claims benefit of U.S. Provisional Application Ser. No. 62/103,447, filed Jan. 14, 2015, entitled "Reliable Configurations of Remote Network Traffic Routing Devices on Untrusted Networks Apparatuses, Methods and Systems," each of which is hereby incorporated by reference herein.

BACKGROUND

A local area network (LAN) is a computer network of interconnected computing devices within a relatively limited area such as a building (e.g., a residence, business, office building, research or academic setting, etc.). Related terms for computer networks within relatively limited areas and/or for particular purposes include personal area networks (PANs), campus area networks (CANs) and metropolitan area networks (MANs) (e.g., respectively corresponding to a room, campus, or specific metropolitan area). For purposes of the present disclosure, the term LAN is used generally to include local areas networks and other similar types of limited area/particular purpose networks such as PANs, CANs, and MANs.

A wide area network (WAN) generally covers a larger geographic area than a LAN. WANs are used to connect together multiple LANs and other types of computer networks (e.g., PANs, CANs, MANs), so that users and computers in one location can communicate with users and computers in other locations. A WAN often relies on leased telecommunication lines/circuits to transport information throughout the WAN and between LANs and other types of networks coupled to the WAN. In some instances, wireless communication interfaces (e.g., 3G technology, 4G technology, 4G LTE technology) may be used to communicatively couple computing devices and LANs to a WAN, different portions/components of a WAN to each other, or multiple WANs. The Internet is generally considered to be a WAN. More specifically, the Internet is the global system of interconnected computer networks (e.g., a "network of networks," including private networks, public networks, academic networks, business networks, government networks) that use the Internet protocol suite (TCP/IP) to link billions of devices worldwide via a broad array of electronic, wireless, and optical networking technologies.

A "router," also referred to herein as a "routing device" or an "integrated services adapter" (ISA) is a computer networking device that facilitates the transfer of electronic information (e.g., in the form of data packets) between computer networks (e.g., between a LAN and the Internet between different portions of a WAN, etc.). In general, a router performs the important function of directing information traffic on the Internet; a data packet is typically forwarded from one router coupled to the Internet to another router coupled to the Internet, until the data packet reaches its intended destination. More specifically, when a data packet is received by a router, the router reads Internet Protocol (IP) address information in the data packet to determine its ultimate destination (ultimate destination IP address). Then, using information maintained in a routing table (or routing policy) of the router, the router directs the data packet to another router coupled to the Internet (which may be an intermediate network node along the packet's journey toward the ultimate destination, or the ultimate destination itself for the data packet). To this end, a router typically includes one or more WAN communication interfaces to facilitate coupling of the router to different physical media types used for WAN connectivity (e.g., copper cables, fiber optic cables, wireless communication links).

Routers typically implement a configuration profile according to which the router transfers data packets between different computer networks (e.g., between a LAN and the Internet). A configuration profile generally includes multiple operational settings (also referred to herein as "atomic settings") that are configurable (e.g., based on certain options for values, or states, for the settings) and that determine certain functions and aspects of operation for the router. Conventional routers often are sold with a "factory" configuration profile including default atomic settings. Some examples of atomic settings that may be included in a configuration profile for a router include, but are not limited to, web access settings (e.g., local user name/ID and password(s)), interface settings (e.g., network interfaces and internet protocol (IP) settings), domain name system (DNS) settings (e.g., including settings to specify whether a DNS resolver uses an internet service provider (ISP) DNS server or performs recursion locally), settings related to the registry of devices on the network (e.g., network adapters' names, media access control (MAC) addresses, and static IP assignments), port forwarding settings (e.g., settings specifying a list of port forwarding rules including source-destination vectors and/or port range, target IP, and protocols), firewall settings, network address translation (NAT) settings, dynamic host configuration protocol (DHCP) settings, point-to-point protocol (PHP) settings, virtual private network (VPN) settings, and virtual area network settings (VLAN).

Some examples of conventional routers include home and small office routers that pass data (e.g., web pages, email, instant messages/text, and videos) between home/office computing devices and the Internet. Other examples include enterprise routers that connect large business or Internet Service Provider (ISP) networks up to core routers, and the core routers in turn forward data at high speed along optical fiber lines.

With respect to LANs, many business organizations own/operate their own LAN (or multiple LANs) to support their electronic business information and communication needs. The devices, infrastructure and functionality constituting a LAN for a business organization may be managed and maintained locally (e.g., by dedicated information technology (IT) staff employed by the business organization). Additionally or alternatively, IT administration for a LAN may be contracted to a third-party IT service provider; for example, a LAN that is owned/operated by a business organization may be remotely managed by a "Managed Service Provider" (MSP) that provides IT services to the business organization (e.g., in some instance, under a subscription model). An MSP often provides IT services remotely (e.g., via the Internet) to multiple business organizations that own/operate respective LANs (e.g., by accessing equipment and infrastructure constituting a given LAN via routers that respectively connect the MSP and the given LAN to the Internet).

SUMMARY

In one example area of commercial endeavor, the Applicant provides products and services for business continuity, planning and disaster recovery (e.g., to ensure that an organization's critical business functions will either continue to operate, despite serious incidents or disasters that might otherwise have interrupted them, or will be recovered to an operational state within a reasonably short time period). One focus area for such products and services relates to backup and restoration of an organization's electronic business data.

In some commercial implementations, the Applicant provides business continuity products and services to Managed Service Providers (MSPs), who in turn provide third-party IT services (based in part on the Applicant's business continuity-products and services) to various business organizations. For purposes of the present disclosure, the business organizations to which MSPs provide third-party IT services are referred to herein as "end-user business organizations" (or, more simply, "end-users"). In some examples of such a commercial implementation, a given end-user maintains (e.g., owns/operates) one or more LANs to support its electronic business information and communication needs, and each of the end-user's LANs includes one or more routers to couple the LAN to a WAN (e.g., the Internet). A given MSP may provide its services to a customer base constituted by multiple end-users; accordingly, a given MSP may be responsible for providing its IT services to multiple LANs, wherein each LAN includes various computing and networking equipment (including one or more routers) to provide electronic business information and communication infrastructure and functionality for a particular end-user.

To support the efforts of multiple MSPs each serving multiple end-users, the Applicant provides, as part of its product suite, backup/restore devices that an MSP may deploy in the LAN of one or more of its end-users to facilitate business continuity functionality. The deployed backup/restore devices in respective end-user LANs implement various functionality for effective image-based backup of an end-user's business data (wherever it may be stored) to a secure cloud storage infrastructure maintained and operated by the Applicant, as well as restoration of stored business data from the Applicant's secure cloud storage infrastructure to the appropriate end-user. The Applicant also provides to each MSP, as part of its service offerings, secure web-based access to one or more Device Management Servers (DMSs) and other computing infrastructure, hosted in the Applicant's web domain, to enable each MSP to remotely administer (e.g., configure and monitor operation of), in a secure and centralized manner, the various backup/restore devices that the MSP has deployed in the multiple end-user LANs for which it provides IT services. In exemplary implementations, the Applicant provides such access to secure centralized remote administration of multiple and geographically distributed deployed backup/restore devices via a web portal including multiple graphical user interfaces or GUIs, provided by one or more DMSs hosted in the Applicant's web domain, to facilitate configuration and monitoring by the MSP of deployed backup/restore devices.

In the context of the foregoing product and service offerings, the Applicant has recognized and appreciated that although deployed backup/restore devices may be conveniently configured and monitored remotely by MSPs (e.g., via a web portal provided by the Applicant to facilitate secure centralized administration of these devices by MSPs), other devices in end-user LANs for which a given MSP provides IT services may not be able to be configured and/or monitored in a similar fashion. In particular, one or more routers of an end-user LAN—which perform the significantly important function of ensuring effective connectivity of an end-user LAN to the Internet—are not able to be remotely configured and/or monitored in a secure and centralized manner. As a result, if problems arise in connection with a given end-user's connectivity to the Internet, an MSP initially has no visibility into the status of one or more routers in that end-user's LAN, and often must travel to the site of the end-user's LAN to initially diagnose and "triage" Internet connectivity problems (and possibly other network problems).

Moreover, the Applicant has recognized and appreciated that in spite of the significant efficacy of its backup and restore products deployed in end-user LANs, and associated centralized device administration services provided to MSPs, the overall efficacy of these products and services may be compromised in the event that one or more routers of an end-user's LAM malfunction. More specifically, as discussed above, in various commercial implementations the Applicants backup/restore product(s) deployed by an MSP in a given end-user's LAN need to maintain effective communication with the Applicant's web domain to ensure a full complement of secure and timely data backup and restore functionality. Accordingly, a malfunctioning router in an end-user's LAN may significantly compromise effective communication between the end-user's LAN and the Applicant's web domain (as well as other web domains of importance to the end-user), thereby compromising backup/restore operations as well as other important aspects of business continuity.

In view of the foregoing, various inventive embodiments disclosed herein are directed to remotely configurable web-enabled routers having failover features (e.g., to ensure connectivity to a particular web domain), and methods and apparatus for reliable web-based administration of such routers. As set forth in greater detail below, inventive web-enabled routers, and various inventive methods and apparatus for configuring, controlling and monitoring such routers, provide for remote, secure, and centralized administration of routers (individually or in groups of multiple routers). Accordingly, these innovations significantly improve end-user LAN maintenance (e.g., by MSPs), facilitate more reliable connectivity to the Internet, and enhance overall business continuity and disaster recovery for end-user business organizations.

More specifically, in one embodiment a web-enabled router is configured to receive (e.g., via a WAN communication interface of the router), data packets representing one or more configuration profiles from one or more device management servers (DMSs) in a first web domain (e.g., operated by the Applicant). Multiple configuration profiles may be stored in local memory of the router, including a default configuration profile, as well as one or more configuration profiles received from the first web domain (which may include the default configuration profile). In one exemplary implementation, the router instantiates one of the configuration profiles received from the first web domain as a new active configuration profile for the router, according to which the router will thereafter transfer data packets between the Internet and the computer network for which it serves as a gateway.

On instantiation of an active configuration profile that was received from the first web domain, the router then controls its WAN communication interface to periodically transmit (e.g., via the Internet) a "router heartbeat" to the first web domain. In general, a router heartbeat comprises one or more data packets including data relating to the router and its operation (e.g., an identifier for the router, one or more values for router status and/or performance metrics such as throughput, latency, bandwidth usage, etc.). In various implementations, the router heartbeat may be used by one or more DMSs in the first domain to ascertain and monitor, on an ongoing basis, the operational health of a given router.

The Applicant recognizes and appreciates that instantiation of a new active configuration profile for a web-enabled router in some instances may cause some malfunction or impaired operation of the router; in particular, instantiation of a new active configuration profile may in some instances impair the router's connectivity to the first web domain (from which it received one or more configuration profiles). Accordingly, in various embodiments the router is configured such that upon instantiation of a new active configuration profile, the router then ensures that it can continue to maintain effective communication with one or more DMSs in the first web domain. To this end, if after instantiation of a new active configuration profile, and upon subsequent transmission of router heartbeats, the router is alerted (e.g., by an Internet Service Provider or ISP) that the heartbeat data packet(s) were not successfully delivered to the first web domain, the router initiates a configuration profile failover process to revert to a previous configuration profile that supported substantially unimpaired connectivity to the first web domain. In particular, in a configuration profile failover process, the router instantiates a "failover configuration profile" as a replacement active configuration profile; such a failover configuration profile may be stored in local memory of the router, and generally is a previous active configuration profile according to which the router effectively transferred data packets to the first web domain.

A web-enabled router according to various embodiments may also include both a wired WAN communication interface and a wireless WAN communication interface (e.g., a 3G, 4G, or 4G LTE communication interface having an associated wireless communication bandwidth) to facilitate transfer of data packets between the computer network for which the router serves as a gateway and the Internet. In one exemplary implementation, the wired WAN communication interface is presumed to provide higher bandwidth and throughput than the wireless WAN communication interface, and hence is treated as the default WAN communication interface for the router. In some embodiments of a web-enabled router with multiple WAN communication interfaces, the router is also configured to implement a WAN communication interface failover process to ensure substantially uninterrupted WAN connectivity for the router. To this end, the router monitors the wired WAN communication interface to detect a wired connectivity Issue between the router and the Internet. Upon detection of the wired connectivity issue, the router controls the wireless WAN communication interface to reserve a first portion of the wireless communication bandwidth for transfer of the router heartbeat to one or more DMSs in the first web domain. The router also or alternatively may reserve some of the wireless communication bandwidth to prioritize data backup operations and/or data restore operations between the computer network for which the router serves as a gateway and the first web domain.

With respect to router configuration profiles provided by one or more DMSs in the first web domain, in some embodiments, configuration profiles for multiple routers may be stored in storage facilities (e.g., one or more repositories) associated with the first web domain. More specifically, configuration profiles for multiple routers respectively deployed in LANs of different end-user business organizations receiving IT services from third-party MSPs may be maintained in one or more repositories associated with the first web domain. Additionally, a given router configuration profile may be associated with multiple "configuration profile variants" (CPVs) also stored in the one or more repositories, wherein the CPVs constitute different versions of the router configuration profile as a function of time (e.g., CPVs provide for historical tracking of changes made over time to a given router configuration profile). Thus, one or more repositories associated with the first web domain may maintain a significant scope of configuration profile information relating to multiple web-enabled routers deployed at different end-users and administered by one or more MSPs.

Regarding administration of web-enabled routers by MSPs (or other parties), in yet other embodiments one or more DMSs in the first web domain also may provide a web portal to one or more MSPs (or other parties), wherein the web portal includes multiple graphical user interfaces (GUIs) to facilitate review and/or selection of stored pre-existing router configuration profiles, and generation of new hybrid configuration profiles based at least in part on pre-existing router configuration profiles. More specifically, a hybrid configuration profile is a configuration profile having multiple respective atomic settings extracted/copied from other pre-existing configuration profiles. The web portal provided to an MSP by the first web domain allows the MSP to configure respective routers in a highly customized and intuitive manner (based on stored pre-existing configuration profiles, intuitive GUIs, and/or generation of hybrid configuration profiles), as well as monitor ongoing performance of deployed routers in different end-user LANs serviced by the MSP. In this manner, one or more DMSs in the first web domain provide for secure remote and/or centralized administration of routers deployed by MSPs in different end-user LANs to which the MSPs provide IT services.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Glossary

Router Configuration Profile: A router configuration profile (or simply "configuration profile") comprises a plurality of operational settings (also referred to herein as "atomic settings") that determine certain functions of the router. During operation of the router, the router facilitates transfer of data packets between different computer networks based in part on the atomic settings in the router configuration profile. In some embodiments, a router configuration profile may be transferred to a router (e.g., via the router's connection to the Internet) from a particular web domain hosting one or more Device Management Servers (DMSs) and associated with storage facilities (e.g., a repository) that store one or more router configuration profiles and provide for secure remote and/or centralized administration of the router.

Atomic Settings: Atomic settings (also referred to herein as "atomic configurations") are elements of a muting configuration profile that determine certain aspects of operation and performance of the router. Generally, respective atomic settings are configurable based on certain options for values (e.g., different IP addresses, other text or numeric identifiers, ranges of values within absolute or relative scales, etc.) or states (e.g., on/off, true/false, select one option from a list, etc.) that a given setting may have. Some examples of atomic settings that may be included in a configuration profile for a router include, but are not limited to, web access settings (e.g., local user name/ID and password(s)), interface settings (e.g., network interfaces and internet protocol (IP) settings), domain name system (DNS) settings (e.g., including settings to specify whether a DNS resolver uses an internet service provider (ISP) DNS server or performs recursion locally), settings related to the registry of devices on the network (e.g., network adapters' names, media access control (MAC) addresses, and static IP assignments), port forwarding settings (e.g., settings specifying a list of port forwarding rules including source-destination vectors and/or port range, target IP, and protocols), firewall settings, network address translation (NAT) settings, dynamic host configuration protocol (DHCP) settings, point-to-point protocol (PPP) settings, virtual private network (VPN) settings, and virtual area network settings (VLAN).

Default Configuration Profile: A default configuration profile (also referred to herein as a "factory configuration profile") comprises a collection of default atomic settings that are instantiated in the router when it is first purchased or deployed (and in some instances stored locally in memory of the router). In some exemplary implementations, the default atomic settings in the default configuration profile ensure connectivity of the router (e.g., via the Internet or other WAN) to a particular web domain hosting one or more Device Management Servers (DMSs) that provide for secure remote and/or centralized administration of the router.

Active Configuration Profile: An active configuration profile is the configuration profile that is instantiated in the router and pursuant to which the router transfers data packets between different computer networks (e.g., between a LAN that includes the router, and the Internet). The default configuration profile in some instances may be the active configuration profile (e.g., when the router is first installed/deployed and powered-up).

Failover Configuration Profile: A failover configuration profile is a former active configuration profile previously instantiated in the router and according to which the router successfully effected the transfer of previous data packets to and from a particular web domain hosting one or more Device Management Servers (DMSs) that provide for secure remote and/or centralized administration of the router. In some embodiments, when an instantiated active configuration profile fails to provide connectivity to the particular web domain hosting the one or more DMSs that provide for secure remote and/or centralized administration of the router, a failover configuration profile is instantiated to ensure connectivity to this particular web domain.

Configuration Profile Variants (CPVs): Configuration profile variants constitute different versions as a function of time of a given router configuration profile, in which one or more atomic settings have been changed from version to version. For example, a given router configuration profile generally identified as "guest_network" (so as to implement appropriate router functionality for an established guest network) may be associated with a plurality of CPVs representing different versions of the configuration profile respectively stored at time T1, time T2, and up to time TN (e.g., guest_network_T1, guest_network_T2, . . . , guest_network_TN). In this manner, CPVs provide for historical tracking of changes made over time to a given configuration profile. It should be appreciated that one CPV of a collection of CPVs may be the default configuration profile (which would be the oldest/earliest CPV in a set of CPVs). It should also be appreciated that a collection of CPVs may represent earlier/previous versions of an instantiated active configuration profile, and one CPV of a collection of CPVs (e.g., an "older" CPV) may be re-instantiated as an active configuration profile. Additionally, one CPV of a collection of CPVs may be instantiated as a failover configuration profile (which, in some instances, may be the default configuration profile). In different embodiments, CPVs for a given configuration profile may be stored locally on the router, and/or in storage facilities (e.g., a repository) associated with a particular web domain hosting one or more Device Management Servers (DMSs) that provide for secure remote and/or centralized administration of the router.

Hybrid Configuration Profile: A hybrid configuration profile is a configuration profile having multiple respective atomic settings extracted/copied from other pre-existing configuration profiles. In some embodiments, at least some of the pre-existing configuration profiles may be stored in storage facilities associated with a particular web domain hosting one or more Device Management Servers (DMSs) that provide for secure remote and/or centralized administration of the router. One or more DMSs in the web domain also may provide a web portal (e.g., to one or more Managed Service Providers or MSPs) including multiple graphical user interfaces or GUIs, to facilitate review of stored pre-existing router configuration profiles and generation of new hybrid configuration profiles based at least in part on pre-existing router configuration profiles.

Router Heartbeat: A router heartbeat (also referred to herein as a "checkin heartbeat") comprises one or more data packets, representing data relating to a particular router and its operation, that are transmitted by the router to a particular web domain hosting one or more Device Management Servers (DMSs) that provide for secure remote and/or centralized administration of the router. In one embodiment, a router heartbeat may include a first code or identifier that identifies the router's instantiated active configuration profile, and one or more additional codes or identifiers representing on operational status of the router ("router status").

Router Status: Router status refers to ephemeral router-related data determined by the context in which the router is operating. For example, router status may include a list of Dynamic Host Configuration Protocol (DHCP) addresses that are leased to devices on a Virtual Local tea Network (VLAN). Router Status also may include values for router performance metrics that reflect the operational state of a router; examples of router performance metrics include, but are not limited to, bandwidth consumed by one or more local area networks supported by the router, bandwidth consumed by one or more clients or users supported by the router, overall bandwidth consumed by the router, router throughput, router latency, router downtime and failover recovery operations, signal strength of a Long Term Evolution (LTE) signal associated with a wireless WAN communication interface of the router.

Untrusted Network: An untrusted network is a network outside of an established network security perimeter. Such networks are considered "untrusted" because they are often beyond the control of a Managed Service Provider (MSP).

BRIEF DESCRIPTION OF THE DRAWINGS

The skilled artisan will, understand that the drawings primarily are for illustrative purposes and are not intended to limit the scope of Hue inventive subject matter described herein. The drawings are not necessarily to scale; in some Instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1 shows an example of a system to configure remote network traffic routing devices with failover features.

FIGS. 2A-2B shows an example of a router to facilitate transfer of data packets between the Internet and a computer network.

DETAILED DESCRIPTION

Figure 2A:
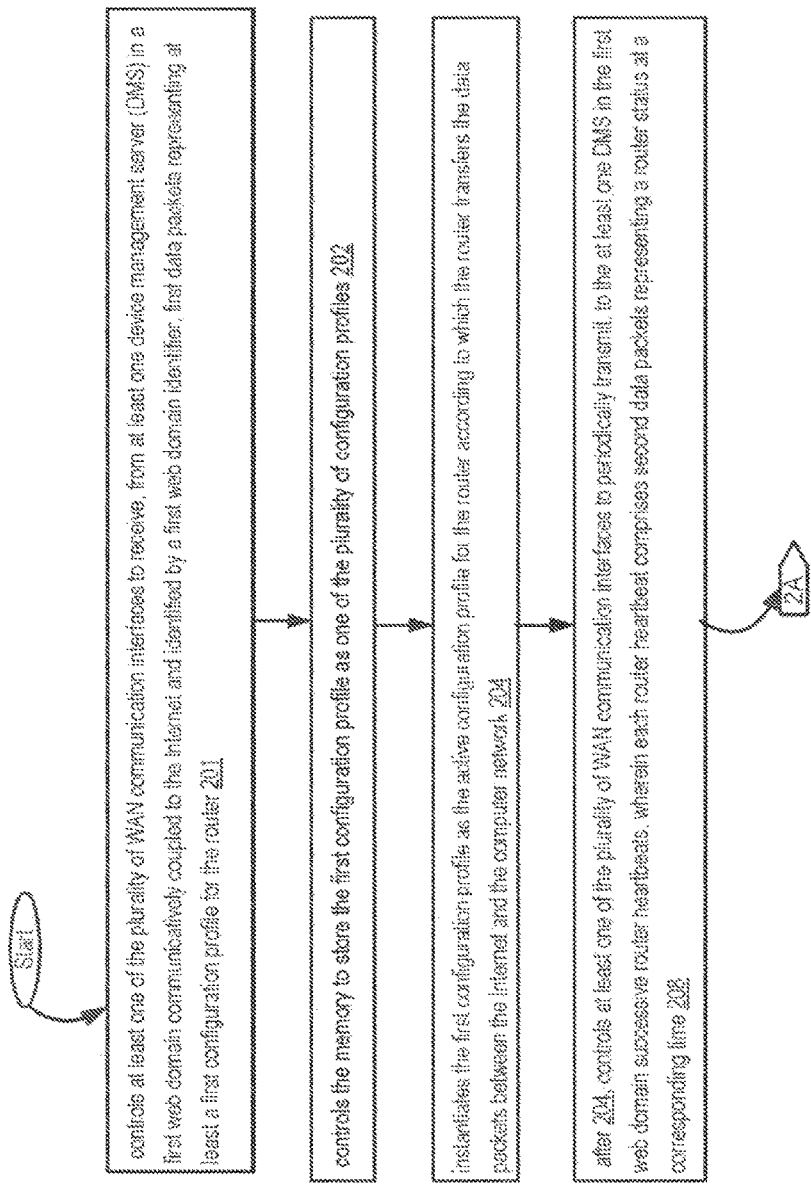

Following below are more detailed descriptions of various concepts related to, and embodiments of, inventive remotely configurable routers with failover features, and methods and apparatus for reliable web-based administration of same. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Embodiments of the present disclosure relate to the configuration, monitoring, and recovery of web-enabled routers to determine misconfigurations, performance deficiencies, and connectivity problems while ensuring business continuity products and services to Managed Service Providers (MSPs), who in turn provide third-party IT services (based in part on the Applicant's business continuity products and services) to various business organizations. One or more of the presented embodiments enable the automatic archiving of configurations installed on web-enabled routers at products and services to Managed Service Providers (MSPs), who in turn provide third-party IT services (based in part on the Applicant s business continuity products and services) to various business organizations. One or more of the presented embodiments enable the automatic archiving of configurations installed on web-enabled routers at different points in time. Such an automatic archiving or backup can be executed periodically at constant interval of time and/or each time a configuration change, or malfunction is detected in a web-enabled router. The periodic streaming of web-enable routers configurations and performance status provided by the Web-Enabled Routers Management DMS system, when combined with the remote aggregate control features of the DMS system may be particularly advantageous for MSP(s) in managing one or more fleet of web-based routers and other local area network devices on behalf of end-users of local area networks (LAN).

Moreover, the presented embodiments provide the means to examine the effects of new web-enabled routing device configurations before these configurations are installed in a routing device. The effects can be calculated through a router simulator and/or a battery of functional tests. MSPs and end-users can be informed in advance about the calculated or forecasted performance and connectivity effects of new atomic settings in a configuration profile allowing these users to make informed decisions about installing or aborting the new atomic settings and/or new configuration profiles. Additionally, MSPs and/or end-users can be informed of emergent changes in the performance of a web-enabled router and connectivity issues affecting a web-enabled router by periodically monitoring said routing performance status and/or communication activity data and comparing said monitored data with data maintained in a performance and connectivity repository.

In addition, some embodiments of the present disclosure further include computer-based methods to automatically adjust the network traffic of a web-based router upon the detection of a misconfiguration, performance deficiency or connectivity problem without the intervention of technical personnel. For example, a web-enabled router device can keep track of one or more admissible or workable routing device configurations backups and/or default factory configurations which can be restored seamlessly after a fault is detected in a web-enabled router. These router auto-healing measures and other management and monitoring policies can be configured by an MSP with respect to one web-enabled router and/or one or more fleets of web-enabled routers remotely through the Internet.

Other embodiments of the present disclosure include means to seamlessly switch back and forward between a wired Wide Area Network (WAN) and a Wireless WAN (e.g., Long Term Evolution based network) in the case of a connectivity issue emerges while either the wired or wireless WAN is utilized as the main WAN to connect to the Internet, and/or the Applicant secure cloud storage infrastructure.

FIG. 1 shows an example of a system to configure remote network traffic routing devices with failover features. A Data Management Server (DMS) 400 includes a user interface/display 401 and/or graphical user interface (GUI) to display and receive information from a server administrator. The server administrator user interface 401 or GUI can receive commands from s processor 407 physically coupled to a memory 403. The memory 403 can store a set of executable instructions 405 which enables a plurality of functions performed by the DMS 400. These instructions include but are not limited to instructions to implement the Remote Configuration (RCONF) Component 900, Schedule Task (ST) Component 1000, the Task Retrieval (TR) Component 1100, the Monitor Remote Router (MRR) Component 1500, the Monitor Remote Router Synchronously (MRRS) Component 1600, the Monitor Remote Router Asynchronously (MRRA) Component 1700R and executable instructions to host a web-based portal 4011 to provide multiple fleet router management functionalities to Managed Service Providers (MSP) users. The aforementioned components will be further described throughout this document. Additionally the DMS 400 includes a communication interface 409 to receive and transmit data to one or more devices connected to the Internet 101.

The DMS 400 is communicatively coupled to the DMS Repository 500. The DMS repository 500 stores configuration profiles, settings, status reports, synchronous and asynchronous router heartbeat or check-in packets and other data related to web-enabled routers from one or more fleets. The DMS server 400 can connect, store, and retrieve data to and from the DMS repository 500. Moreover, the DMS repository 500 is enabled to receive and transmit data to one or more devices for example a DMS auxiliary server as described in further embodiments presented in this document.

The Managed Service Provider (MSP) interface 300 which includes a user interface/display and or GUI 301. In some implementations, the interface/display or GUI 301 can be a web-based application, for example the MSP portal 4011 hosted by DMS server 400. The interface 301 can be used by a MSP user to receive information about the status of one or more web-enabled routers under the jurisdiction of an MSP user. Another use of the interface/display or GUI 301 by the MSP users can be to configure a remote web-enabled router or another remote device under the jurisdiction of the MSP user. The user interface can received commands from a processor 307 physically coupled to a memory 303 with a set of executable instructions 305 to run, for example, a browser in which the MSP user can bad the MSP portal hosted by the DMS server 400. Additionally the device 300 includes a communication interface 309 to receive and transmit data to one or more devices through the Internet 101.

The Local Area Network (LAN) 103 includes the router 200A, one or more local servers 1031, a dedicated backup device 1035, a local configuration interface 700A, and other computing devices 1033, for example, facsimile, printers and the like devices shared by the clients of the LAN 103. In some implementations, the router 200A can comprise a local repository to stored or retain multiple versions of one or more configuration profile, including, for example a factory configuration profile enabling connectivity to the Internet 101 and the DMS server 400.

The local configuration interface 700A can be used by an end-user of the LAN 103 to create and/or modify one or more configuration profiles, and/or atomic setting of the router 200A. Moreover, the router 200A can also be managed remotely by a MSP user through the MSP portal (not shown in FIG. 1).

The LAN 105 includes the router 200B and the router 200C, one or more local servers 1051, a dedicated backup device 1055, a local configuration interface 700B, and other computing devices 1053, for example, facsimile, printers and the like devices shared by the clients of the LAN 105. In some implementations, the routers 200B and 200C can be operatively coupled to the backup device 1055. The backup device 1055 can store or retain multiple versions of one or more configuration profiles installed over time on either the router 200B and/or the router 200C. As such, the backup device 1055 can retain multiple previous configuration profiles and atomic settings that can be reinstalled on the routers 200B and/or 200C.

As previously explained with respect to the LAN 103, the local configuration interface 700B Can be used by an end-user of the LAN 105 to create and/or modify one or more configuration profiles, and/or atomic setting of the router 200B and 200C. Moreover, the routers 200B and 200C can also be managed remotely by a MSP user through the MSP portal (not shown in FIG. 1).

FIG. 2 shows an example of a web-enabled router to facilitate transfer of data packets between the Internet and a computer network. A router to facilitate transfer of data packets between the Internet and a computer network according to an active configuration profile instantiated in the router, the router comprising: a plurality of wide area network (WAN) communication interfaces to facilitate the transfer of the data packets to and from the Internet, the plurality of WAN communication interfaces comprising: a wired WAN communication interface; and a wireless WAN communication interface having a wireless communication bandwidth; a processor; and a memory to store: processor-executable instructions; and a plurality of configuration profiles for the router, the plurality of configuration profiles including the active configuration profile and at least one failover configuration profile, wherein upon execution by the processor of the processor-executable instructions, the processor:

A) controls at least one of the plurality of WAN communication interfaces to receive, from at least one device management server (DMS) in a first web domain communicatively coupled to the Internet and identified by a first web domain identifier, first data packets representing at least a first configuration profile for the router; B) controls the memory to store the first configuration profile as one of the plurality of configuration profiles; C) instantiates the first configuration profile as the active configuration profile for the router according to which the router transfers the data packets between the Internet and the computer network; D) after C), controls at least one of the plurality of WAN communication interfaces to periodically transmit, to the at least one DMS in the first web domain, successive router heartbeats, wherein each router heartbeat comprises second data packets representing a router status at a corresponding time: E) after D), if at least some of the successive router heartbeats are not delivered to the at least one DMS in the first web domain within a first transmission period, instantiates the at least one failover configuration profile for the router as a new active configuration profile according to which the router effectively transfers the successive router heartbeats to the at least one DMS in the first web domain, wherein the at least one failover configuration profile is a previous active configuration profile according to which the router effectively transferred previous data packets between the computer network and the first web domain; and F) monitors the wired WAN communication interface to detect at least one wired connectivity issue between the router and the Internet using the wired WAN communication interlace, wherein upon detection of the at least one wired connectivity issue, the processor: F1) controls the wireless WAN communication interface to reserve at least a first portion of the wireless communication bandwidth for transfer of at least the successive router heartbeats and third data packets between the computer network and the at least one DMS in the first web domain, wherein the third data packets relate to at least one of a data backup operation and a data restore operation between the computer network and the first web domain.

Figure 3:
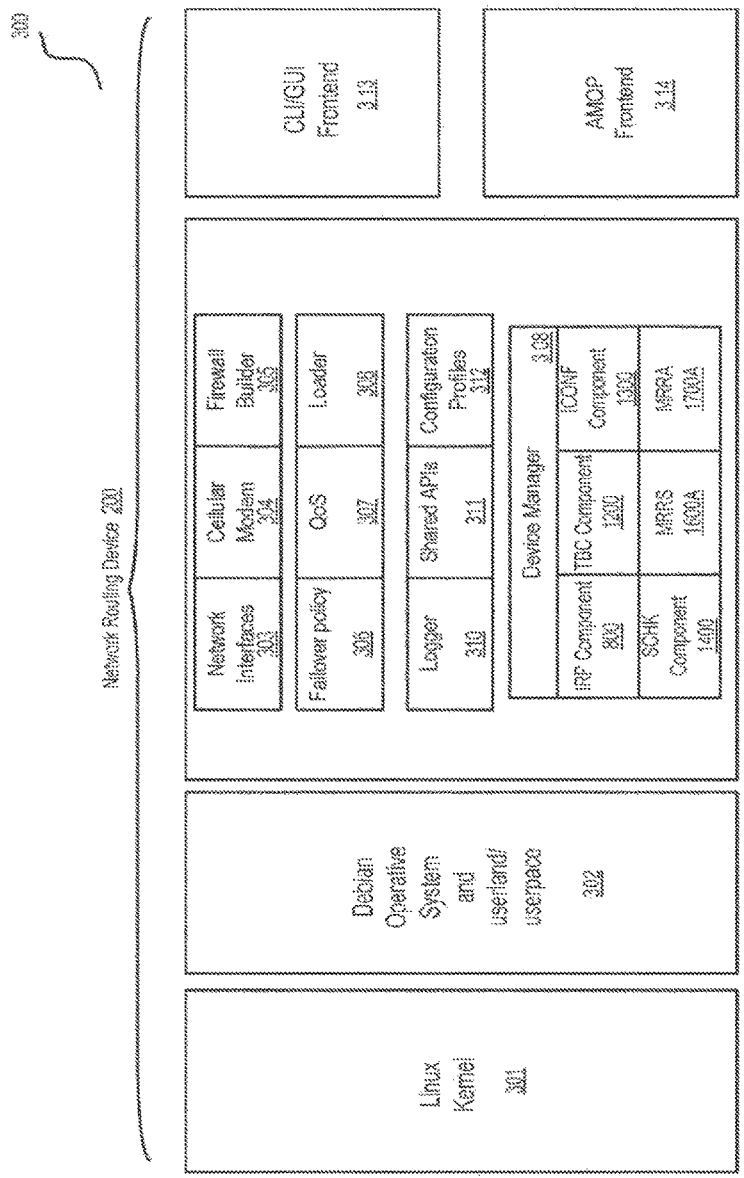
FIG. 3 shows examples of specialized logic modules comprised router with failover features.

FIG. 3 shows examples of specialized logic modules comprised in a network traffic routing device. In one embodiment, a network traffic routing device 200 can run on a Linux kernel 301 with a customized operative system 302 for example, Debian operative system, comprising a set of libraries for performing input/output or otherwise interacting with the kernel 301. Furthermore, the router 200 can comprise a plurality of customized modules, including but not limited to network interfaces configuration module 303 (e.g., LAN, WAN, Internet), cellular modem module 304, firewall builder module 305, failover policy model 306 (for instance to specify what the router 200 should do when Internet connectivity is lost), quality of service (QoS) module 307, a device manager module 308 to provide services to a plurality of devices connected to the interfaces of the router 200 and manage the operation of functional components.

The loader component 308 executes scripts and/or other executable code on router 200, a logger component 310 keeps track of synchronous and asynchronous events affecting the router 200. A library of shared APIs 311 are available to be called by an end-user a MSP user, a script or other type of executable code to modify a functionality of a router 200 and/or other devices connected to the router's local area network for example a backup device (e.g., backup device 1035 in FIG. 1). A collection of configuration profile versions 312 which can be installed upon a user request and/or as specified by a failover policy 306.

In some implementations, the router 200 can comprise a graphical user interface (GUI) and/or command line interface (CLI) 313 to facilitate an end-user the configuration of the router. The router 200 can comprise a plurality of frontend interfaces and services including but not limited to an application layer protocol for message-oriented middleware, for example, AMQP 314.

Additional components in the router 200 include but are not limited to Install Router Profile (IRP) component 800, Template Based Configuration (TBC) component 1200, Internal Configuration component 1300, Synchronous Check-in component 1400, Monitor Remote Router Synchronously component 1600A, and Monitor Remote Router Asynchronously component 1700A. The aforementioned components will be further described throughout this document.

Figure 4A:
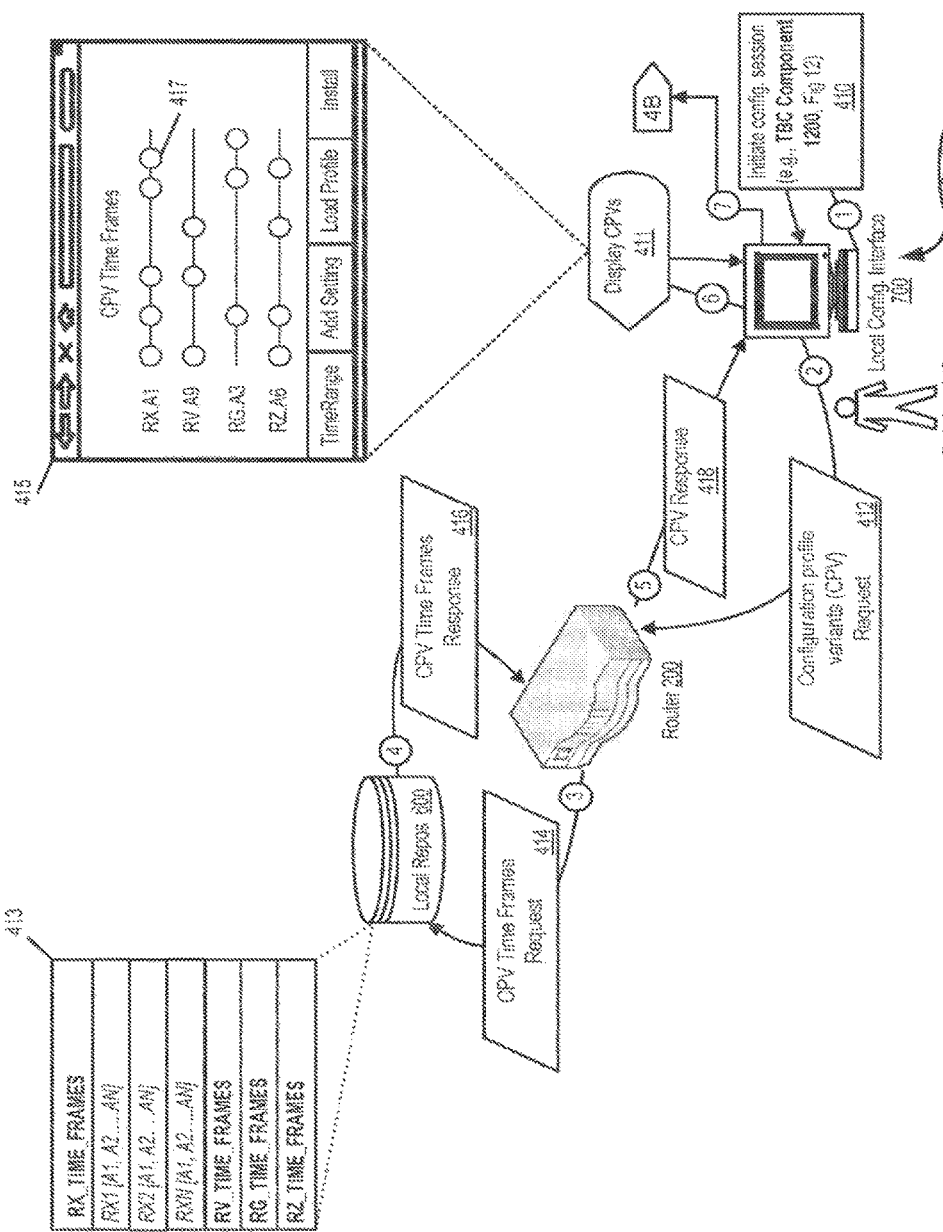
FIGS. 4A-4B show an example of a data flow to configure a hybrid profile for a local network in a router.
Figure 4B:
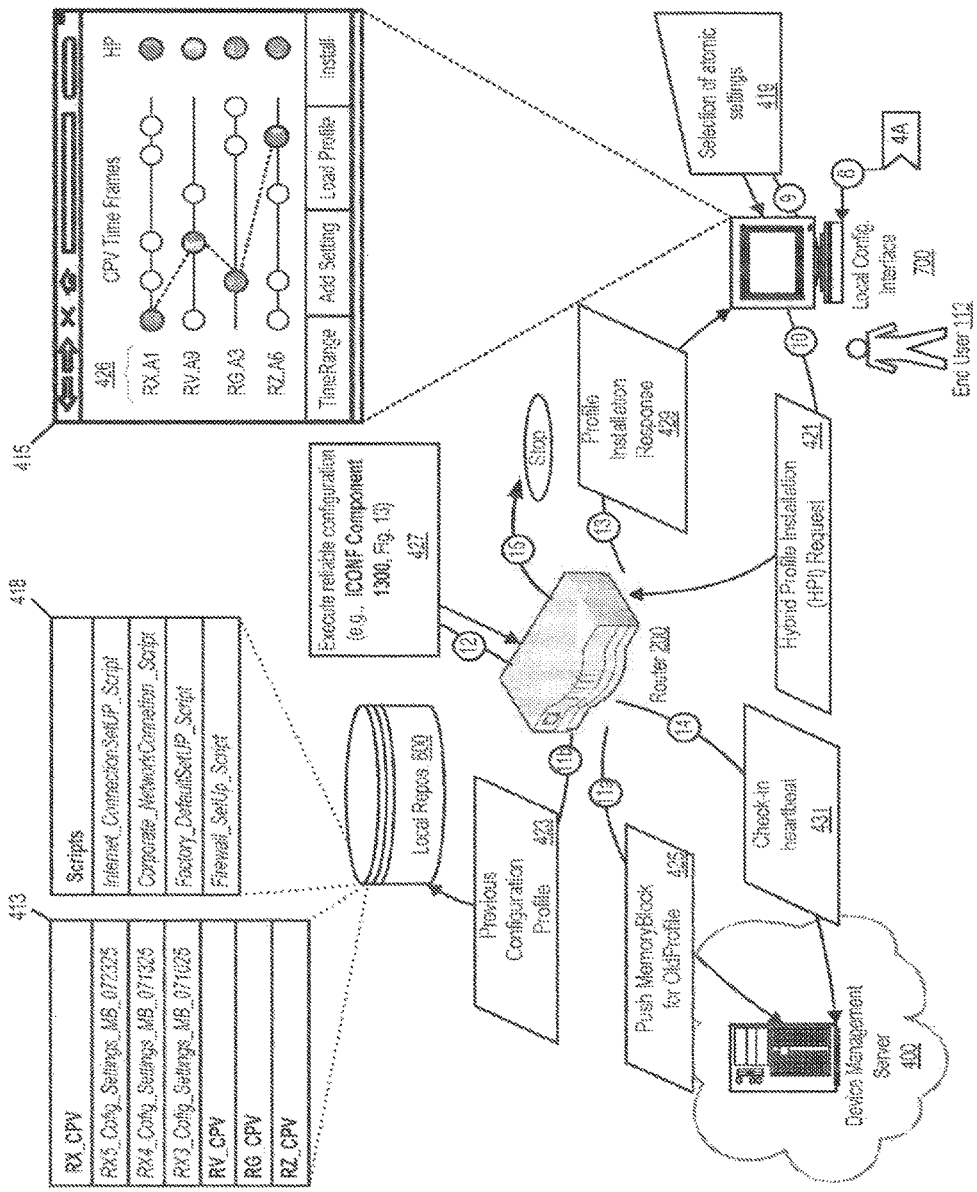

FIGS. 4A-4B show an example of a data flow to configure a hybrid profile for a local network traffic routing device. With respect to FIG. 4A, an end-user 112 can initiate a configuration session, e.g., via the TBC Component 1200, explain in this document with respect to FIG. 12. During such a configuration session the end-user 112 can select a plurality of traffic router configuration profile variants (CPV). A configuration profile variant can be a configuration profile that is installed on the router device for a special event such as a gathering of individuals to engage in a multiplayer game over a local area network. Another variant example could be a configuration profile featuring a network-wide parental control. Yet another variant example can be a profile configured to connect multiple devices from two or more local area networks wirelessly. Besides configuration profiles variants generated for a specific event or purpose, configuration profile variants can also be generated by tracking the changes performed over time on the configuration profile of the router 200. For example, if a configuration setting is modified from an original configuration profile of the router 200, two configuration profile variants of the same profile are registered or stored in the router 200: a first configuration profile variant corresponding to the original configuration and a second configuration profile variant corresponding to the modified configuration.

Each router configuration profile includes two or more atomic settings and has at least one atomic setting value that differentiates the profile variant from other existing router configuration profiles. An atomic setting can be characterized by having a functional or performance effect on a network traffic routing device or router 200. Some examples of atomic settings comprised in a configuration profile include but are not limited to firewall settings, network address translation (NAT) settings, dynamic host configuration protocol (DHCP) settings, point-to-point protocol (PPP) settings, virtual private network (VPN) settings, virtual area network (VLAN) settings, and web access settings.

Specific examples of atomic settings include but are not limited to web access settings comprising local users and passwords; interface configurations including network interfaces and internet protocol (IP) settings; domain name system (DNS) settings including configurations to specify how a DNS resolver behaves for example whether the resolver uses an internet service provider (ISP) DNS server or performs recursion locally; configurations related to the registry of devices on the network, including network adapters' names, media access control (MAC) addresses, and static IP assignments; and port forwarding configurations for example configurations specifying a list of port forwarding rules including source-destination vectors and/or port range, target IP, and protocols.

In one embodiment, the end-user 112 can select CPVs from a list containing identifiers of the available variant profiles displayed through the configuration interface 415. Alternatively or additionally, the end-user 112 can select from a filtered selection of profiles that are associated with a specific atomic setting. One skilled in the art should readily appreciate that there could be numerous ways to enable the selection of CPVs based on the atomic settings that the user 112 prioritizes or finds more relevant.

Once the end-user 112 has selected a set of configuration profile variants, the router 200 receives a configuration profile variant request 412. Thereafter, the router 200 can send a CPV time frame request 414 to the local repository 600. The local repository 600 can be implemented as a local repository or as a remote repository with respect to the LAN. The CPV time frame request 414 can comprise identifiers and/or pointers to an indexed data structure with a plurality of CPVs 413. The router 200 can retrieve a data structure comprising the selected CPV time frames through the response 416. Alternatively, the time frames can be generated in real-time by, for example, recursively rolling back snapshots or through a revision control model. Thereafter, the router 200 cam send the retrieved time frames to the configuration interface 415 in a CPV response 418. When the configuration interface 415 receives the requested CPV time frames, the CPVs are displayed 411 as lime lines with points in time e.g., 417 indicating when the value of one or more atomic settings were modified for a given CPV. In other instances, the end-user 112 can select a variant profile by selecting a point in a time line representing the lifespan of a configuration profile. Such a point in the time line can be associated with a unique variant of the configuration profile representing the state of the profile at the selected point.

With respect to FIG. 4B, during the selection of atomic settings 118, the end-user 112 can select one or more scripts 118 available in the router 200 containing automated series of instructions to set one or more atomic configurations of the router 200. Examples of such scripts include but are not limited to a script to establish an internet connection, a script to connect to a corporate network, a script to return the router 200 to its factory settings, a script to set up a preconfigured firewall and lire like user and non-user define scripts. The scripts can be requested from the router 200 to the local repository 600. Moreover, the scripts can likewise be employed by MSP(s) managing network infrastructures on behalf of one or more end-users. In such a case, some atomic configurations values may be considered appropriate or best practices settings. For example, MSPs can be interested in designating a specific DNS resolution service provider across the LAN(s) under their jurisdiction. In some implementations, MSP(s) and/or end-users can customize one or more scripts to designate specific DNS service providers and/or other atomic settings which are common among their LAN nodes or which are considered best practices.

In one embodiment, the configuration interface 415 displays a set of selected profiles with their respective atomic settings at selected from different points in a plurality of CPVs time lines 426. During the selection of atomic settings 418, the end-user 112 can select or mark one or more atomic configurations to be installed on the router 200. For example, the user 112 can select an atomic setting from the time line of the CPV RX.A1 and another atomic setting from the CPV RV.A9 as shown in the interface 415. Each point in the CPV time line can represent a specific atomic configuration for a corresponding CPV; for example, for the CVP RX, the time line to the atomic configuration A1 is displayed on 415. However, other abstraction levels can be displayed in a similar form; for example, a time line displaying the points in time when any atomic configuration of the CPV RX was modified. In such a case, the user can hover or click on a point and a pop-up window and/or similar mechanism can display the atomic settings modified at that time.

Once the selection of the atomic settings is performed, the router 200 can receive a new hybrid profile installation request 421. Thereafter, the router 200 can store reference markers or pointers to a memory block containing an old profile 423 in the local repository 600. Such an old profile may correspond to the active configuration profile that will be replaced by the new hybrid profile and can be maintained in a local collection of CPVs 413. Additionally or alternatively, the router 200 can push 425 the reference markers or pointers of a memory block containing said old active configuration profile to a device management server 400. As such, the old configuration profile may be remotely available via the DMS server 400 if ever needed by the router 200. The captured old profile is registered by the DMS server as a CPV associated with the router 200, and can lie available to and MSP user and/or the end-user 112 upon request.

In the example herein, the router 200 generates a CPV upon the reception on a new hybrid profile installation request 421 however; the router 200 can generate configuration profiles variants periodically and/or conditionally. For instance, the router 200 may generate CPVs in response to events including a change on one or more predefined atomic settings or an abrupt and/or semi-stationary change in a router performance metric, such as throughput, latency and the like metrics. The configuration profile variants can be generated by a data replication service, through full, incremental or differential backups, copy-on-write, redirect-on-write, split-mirror snapshots or any combination thereof. In other embodiments, the configuration profiles can be generated utilizing an indexed database and/or a version control system. In other further embodiments, the configuration profile variants can be stored in a structure substantially similar to a journaling file system's enabling the recovery of write commands after the detection of a system fault.

Figure 13:
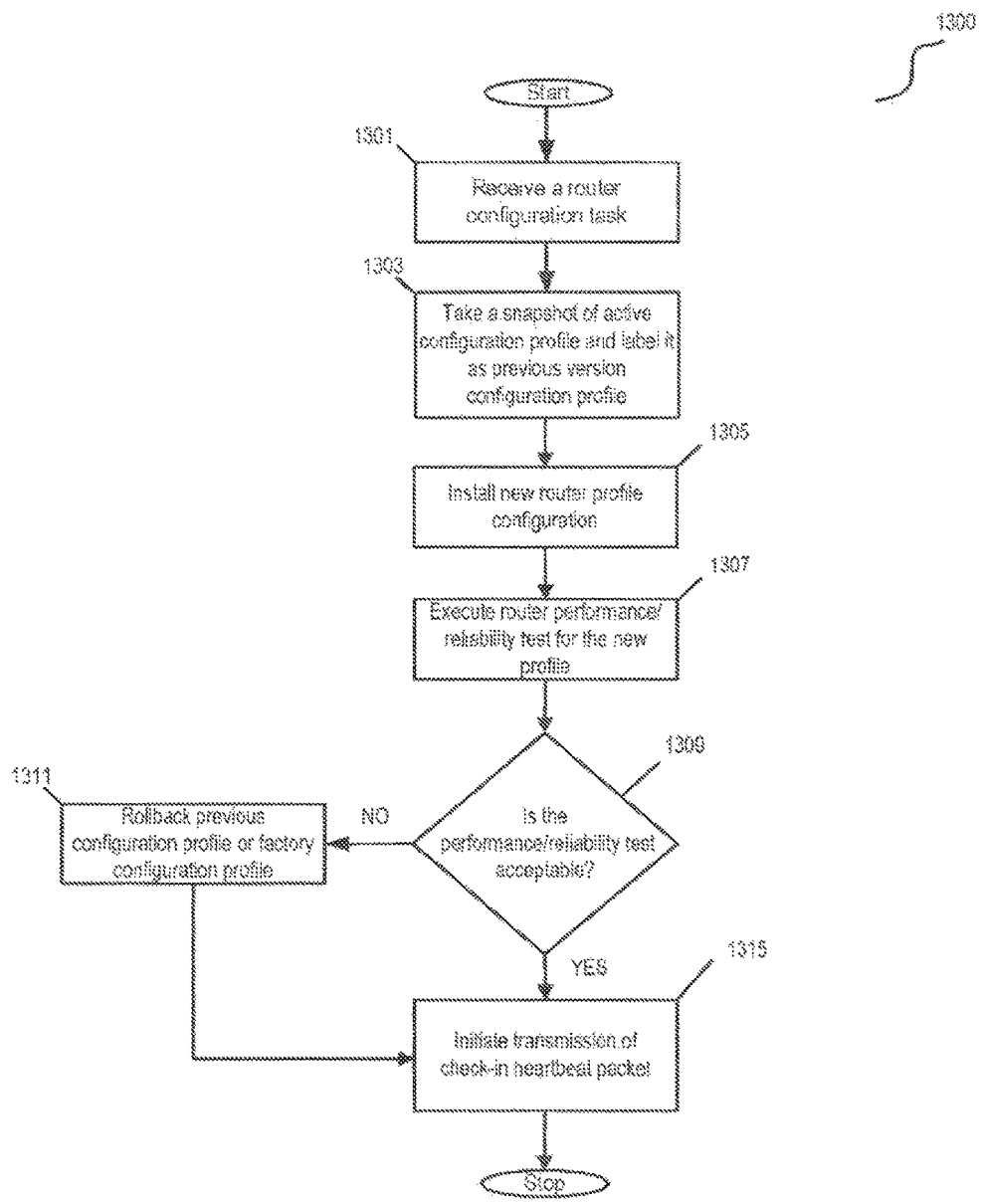
FIG. 13 shows an example of a logic flow for a reliable web-enabled router configuration internal process, e.g., ICONF Component 1300.

After the old profile has been captured through the operations 425 and/or 423, the router 200 executes a reliable configuration of the hybrid profile, e.g., via the ICONF Component 1300, further explained with respect to FIG. 13. The router 200 can perform a series of functionality tests including but not limited to connectivity tests and simulations to estimate performance metric values of the router 200 configured with the generated hybrid configuration profile. The information gathered from the tests and simulations is sent by the 200 to the end-user 112 in a profile installation response 429 to be displayed on the configuration interface 415. An example profile installation response 429, substantially in the form of an HTTP(S) POST message including XML-formatted data, is provided below:

```
POST /profile_installation_response.php HTTP/1.1
Host: www.configurationInterface.com
Content-Type: Application/XML
Content-Length: 667
<?XML version = "1.0" encoding = "UTF-8"/>
<installation_response>
    <timestamp>2020-12-12 15:22:43</timestamp>
    <user_name>John Doe</user_name>
    <user_credentials>
        <password>secretpass1234</password>
        <private_key>h767kwjiwnfe456#@hnniimidrtsxbi</private_key>
    </user_credentials>
    <!- after installation performance metrics and potential issues
are provided to the user ->
<router id= 2121>
    <model>DT3228</model>
    <manufacturer>Datto</manufacturer>
    <memory> 355328K/37888K</memory>
    <cpu>S6-11@700MHz</cpu>
    </router>
<performance_metrics>
    <throughput frameSize=128> 77M </throughput>
    <latency> 37ms </latency>
</performance_metrics>
<warnings num=3>
    <w1> Quality-of-service QOS: a QOS rule was removed which
prioritize TCP standalone packets and can affect TCP
transmissions and reception throughput under link saturation
conditions</w1>
    <w2> Firewall: A new firewall rule prevents 3 guests from
accessing the Internet </w2>
    <w3> Latency: The configured DNS server jdoe.com takes 500ms to
respond</w3>
</warning>
</installation_response>
```

The end-user can decide to keep the new router configuration corresponding to the hybrid configuration profile by confirming the installation after reviewing the results of the testing and simulation. A check-in heartbeat 431 can be sent to the DMS server 400 indicating the router 200 status and data of the new configuration. Note that upon reception of the heartbeat 431 the DMS server 400 can notify the MSP use in charge of the management of the LAN where the router 200 resides about the configuration change made by the end-user 112.

In some embodiments, the end-user 112 can configure the router 200 tem such that the router 200 may initially perform in an acceptable manner. However, a change in the router configuration, for example, a change to an specific atomic setting can cause a long term failure or emergent failure affecting the performance of the router 200. Such a failure or deficiency in performance can emerge not immediately but after some time has elapse after the responsible atomic setting was changed, resulting in a non-obvious relation between the fault and the configuration change. For example, the end-user U2 can configure an Internet Small Computer Interface (iSCSI) to utilize the same NIC that is utilized by the router's primary WAN connection. One possible effect from the aforementioned configuration change can be that the iSCSI incoming and outgoing traffic eventually saturates the WAN connection. In such a case, the router 200 can detect the performance issue by for example, determining that a periodic check-in heartbeat has been failed to reach the router management server 200 for a predetermined period of time and/or by detecting that there is a high latency in the network traffic handled by router 200. Thereafter, the router 200 can intelligently infer which of the recent configuration changes is responsible of a failure and/or performance deficiency by, for example, querying a database which comprises information relating the last atomic configuration changes executed over the router 200 and a corresponding list of possible/probable faults and/or performance deficiencies each atomic configuration can cause over time.

Figure 5A:
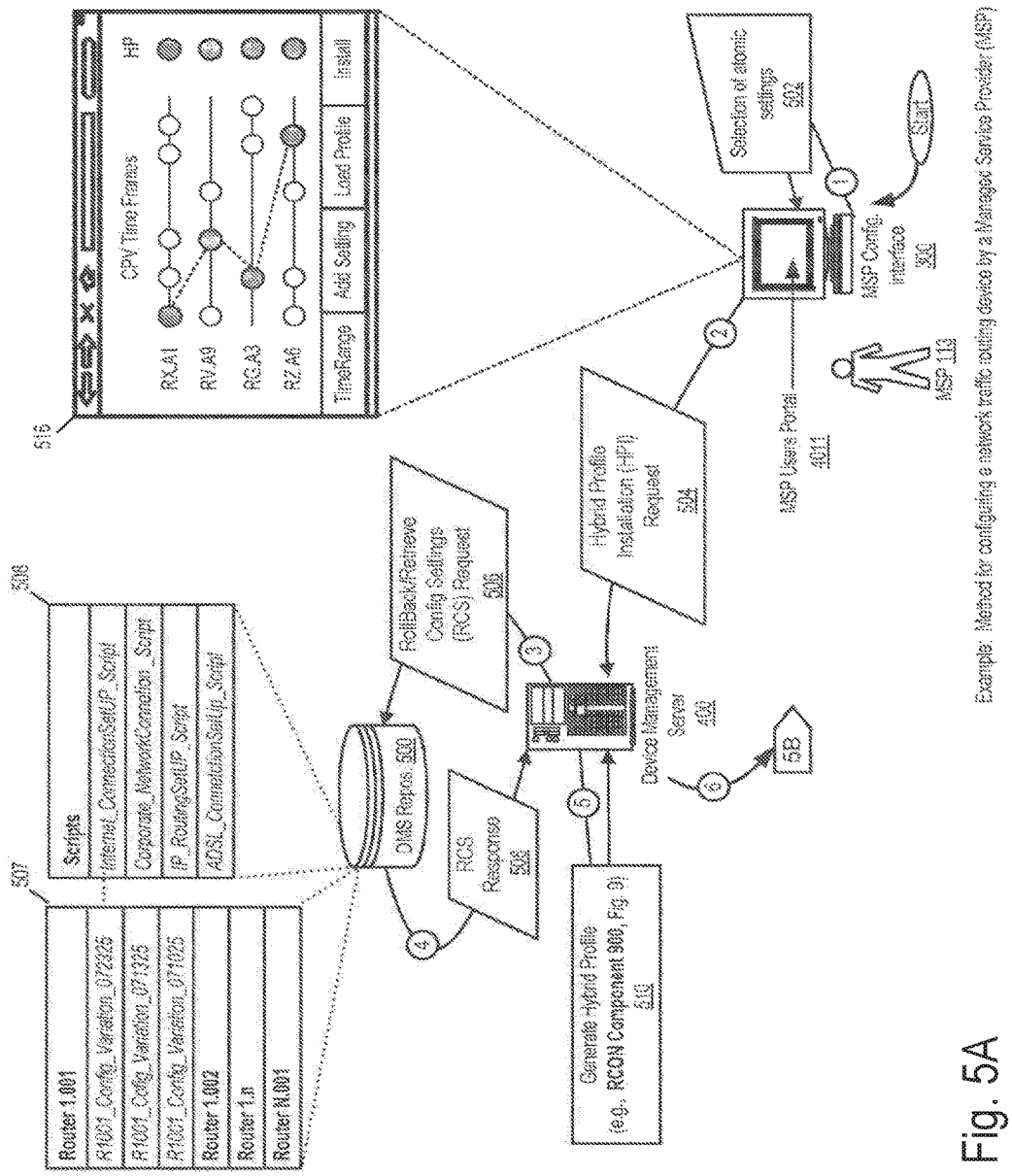
FIGS. 5A-5B show an example of a data flow for configuring a network traffic routing device by a Managed Service Provider (MSP).
Figure 5B:
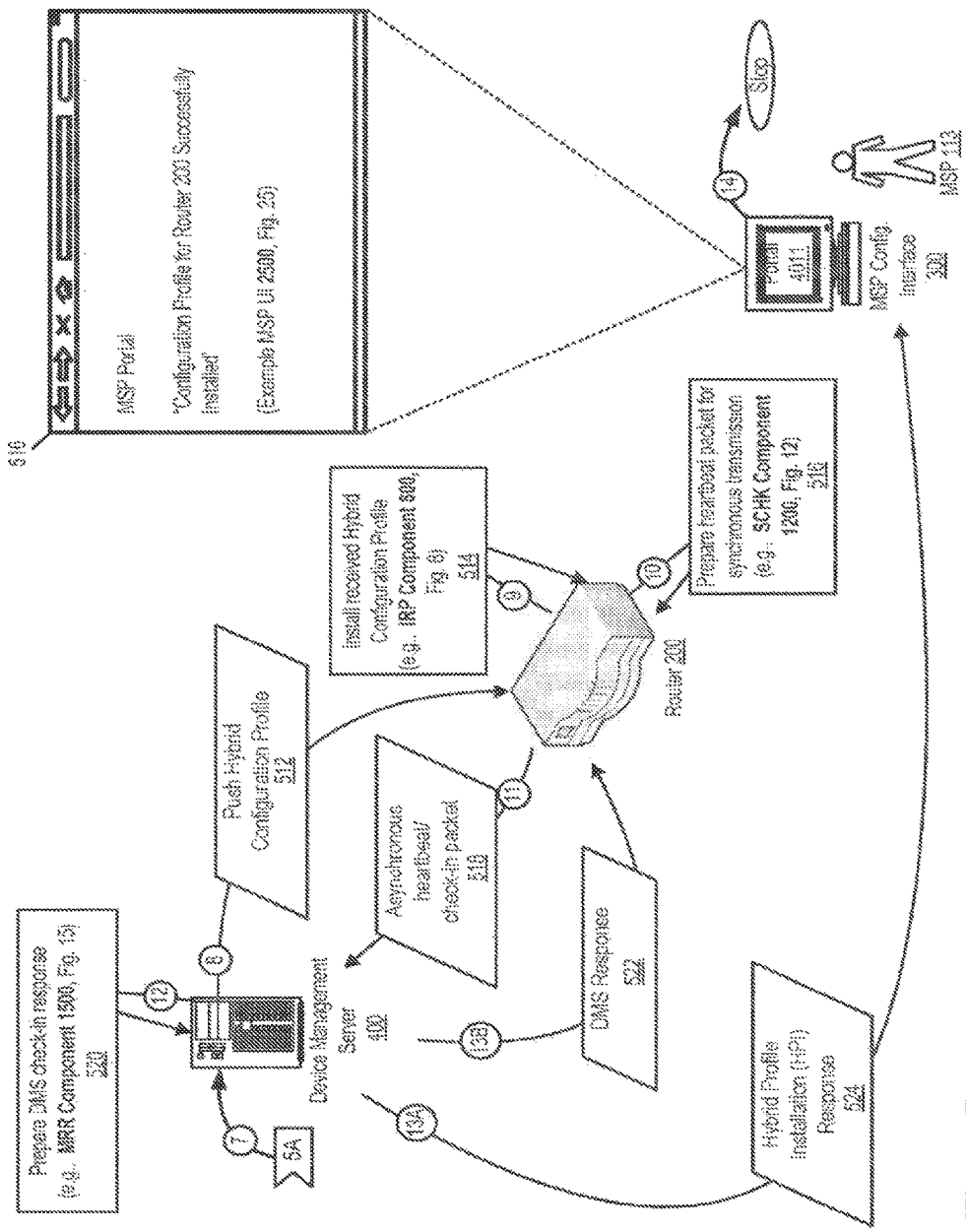

FIG. 5A-5B show an example of a data flow for configuring a network traffic routing device by a Managed Service Provider (MSP). With respect to FIG. 5A, a MSP user 113 can initiate connect to the MSP portal 4011 hosted by the DMS server 400. Thereby, the MSP user 113 can start a configuration session for a remote router 200 via the MSP configuration interface 300. A MSP user 113 can select one or more atomic settings 502 from one or more CPVs available in the DMS server 400. The selection of the atomic settings can be made in similar ways as the interactions described with respect to FIG. 4A and FIG. 4B. For example, the MSP user 113 can select multiple atomic settings from more than one CPV as shown in 516. Note that in this instance, the atomic settings available to the MSP user 113 include CPVs captured from multiple routers managed or accessible to the MSP user 113 as shown in 506.

After tile MSP user 113 made a selection of atomic settings, the MSP configuration interlace can send a hybrid profile installation request 504 to the DMS server 400. Thereafter, the DMS server 400 can transmit a Rollback/ Retrieve Configuration Settings (RCS) Request 506 to the DMS repository 500 comprising identifiers and/or pointers to an indexed data structure with a plurality of CPVs 507. The DMS server 400 can retrieve a data structure comprising the selected CPV atomic settings in the response 508. Thereafter, the DMS server 400 can generate a hybrid profile 510 via the RCON Component 900, further described with respect to FIG. 9.

Thereafter, the DMS server 400 can push 512 the generated configuration profile to the remote router 200. The router 200 can install the hybrid configuration profile 520 via the IRP Component 800, further described with respect to FIG. 8. The router 200 can then prepare a heartbeat packet for synchronous transmission of a check-in and/or phone home message 516 via the SCHK Component 1200 further explained with respect to FIG. 12. The router 200 can then send an asynchronous heartbeat/check-in packet 518 to the DMS server 400 comprising information regarding the router status, and configuration.

Upon the reception of the heartbeat 518, the DMS server 400 can prepare a response with a task to be performed by the router 200. For example, a task sent to the router 200 could be to set an interval or A time for the router to iteratively or synchronously sent a heartbeat or check-in packet to the DMS server 400. For another example, a task sent by the DMS server 400 to the router 200 can specify resetting a device, for example the backup device 1035 shown in FIG. 3 that is in the same LAN as the router 200. Other type of tasks can include installing software updates in one or more devices within the LAN of the router 200 and/or changing an atomic setting upon the detection of a deficiency in a router performance metric.

In some implementations, the DMS server 400 sends a notification packet 524 to the MSP configuration interface 300 to Inform the MSP user 113 about a successful or unsuccessful installation of the hybrid profile on the router 200. The MSP user 113 can view the content of the notification 524 via the screen 516 of the MSP portal 4011 loaded on the MSP configuration interface 300.

Figure 6A:
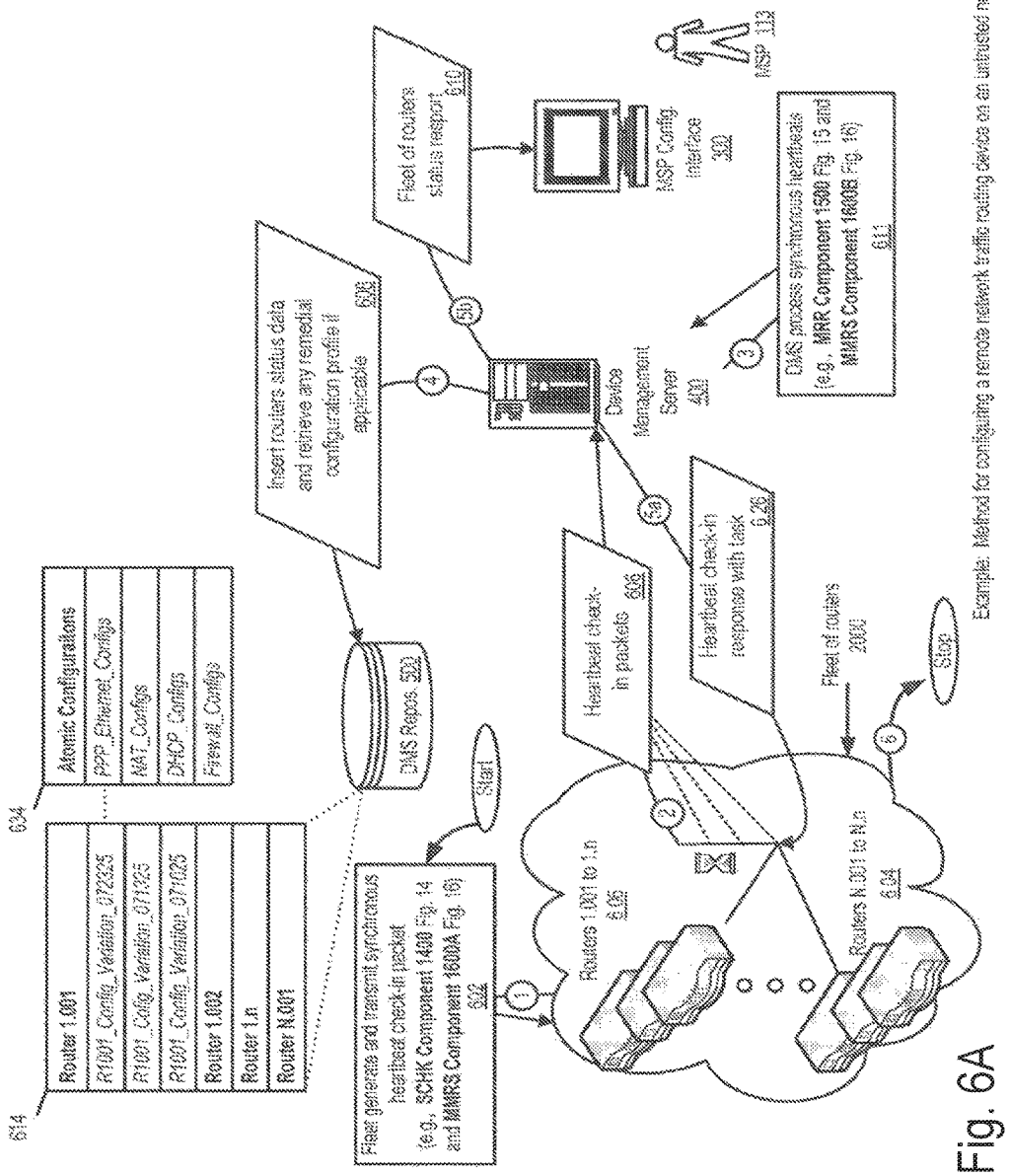
FIGS. 6A-6B show an example of a data flow for monitoring a fleet of routers installed in an untrusted network.
Figure 6B:
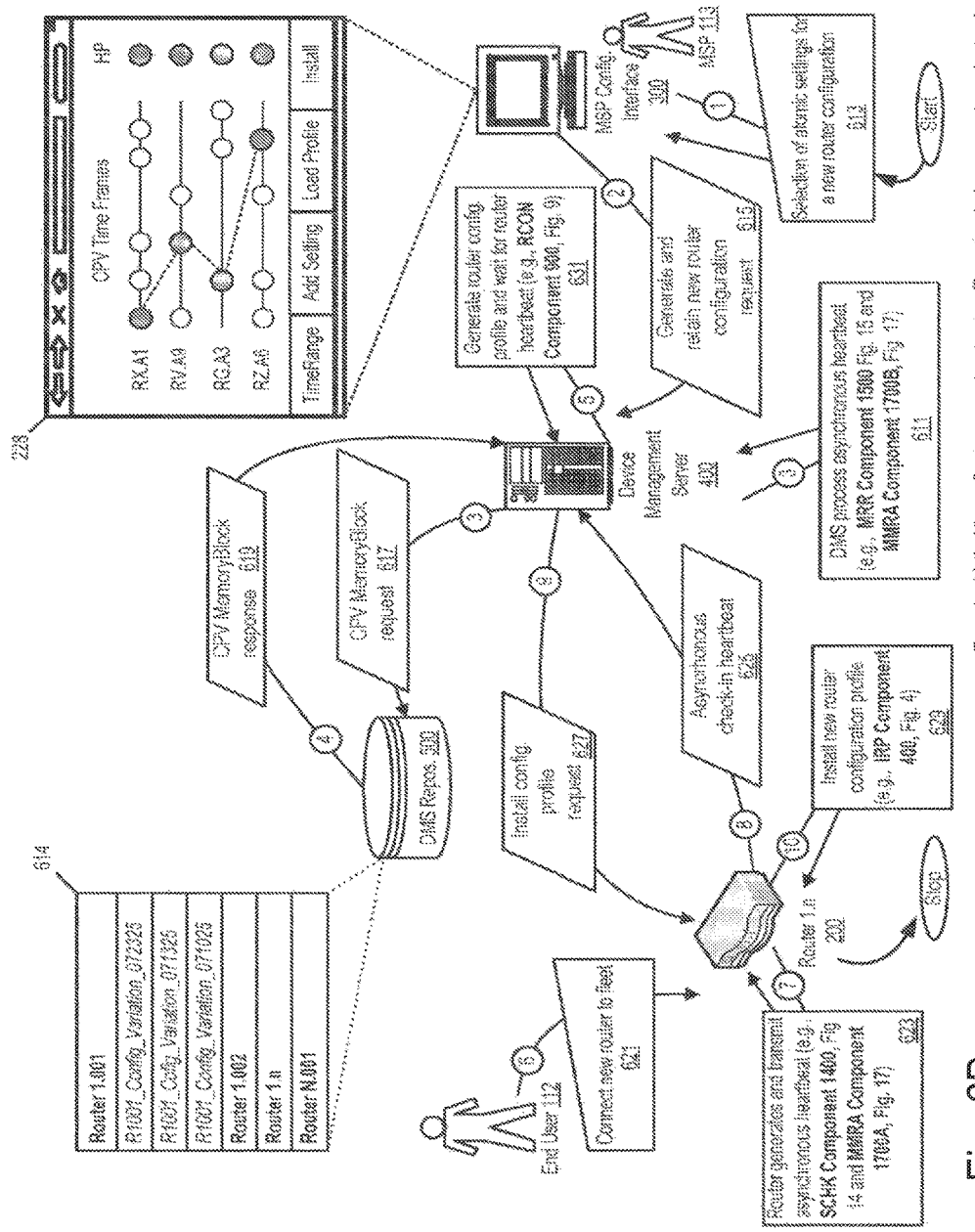

FIG. 6A-6B show an example of a data flow for monitoring a fleet of routers installed in an untrusted network. With respect to FIG. 6A, the DMS server can monitor and manage several fleets of routers, for example fleet 604 and fleet 606. Each router in each fleet is configured to send a heartbeat packet at a preconfigured interval of time A. The preconfigured time interval A can vary among different routers in a fleet and/or upon request of the DMS server 400 via a task. The generation and transmission of these synchronous heartbeats 602 is executed via the router components SCHK Component 1400 and MMRS Component 1600A, further described with respect to FIG. 14 and FIG. 16. Accordingly, heartbeat check-in packets 606 are periodically sent to the DMS server 400 by each router in a fleet.

Figure 15:
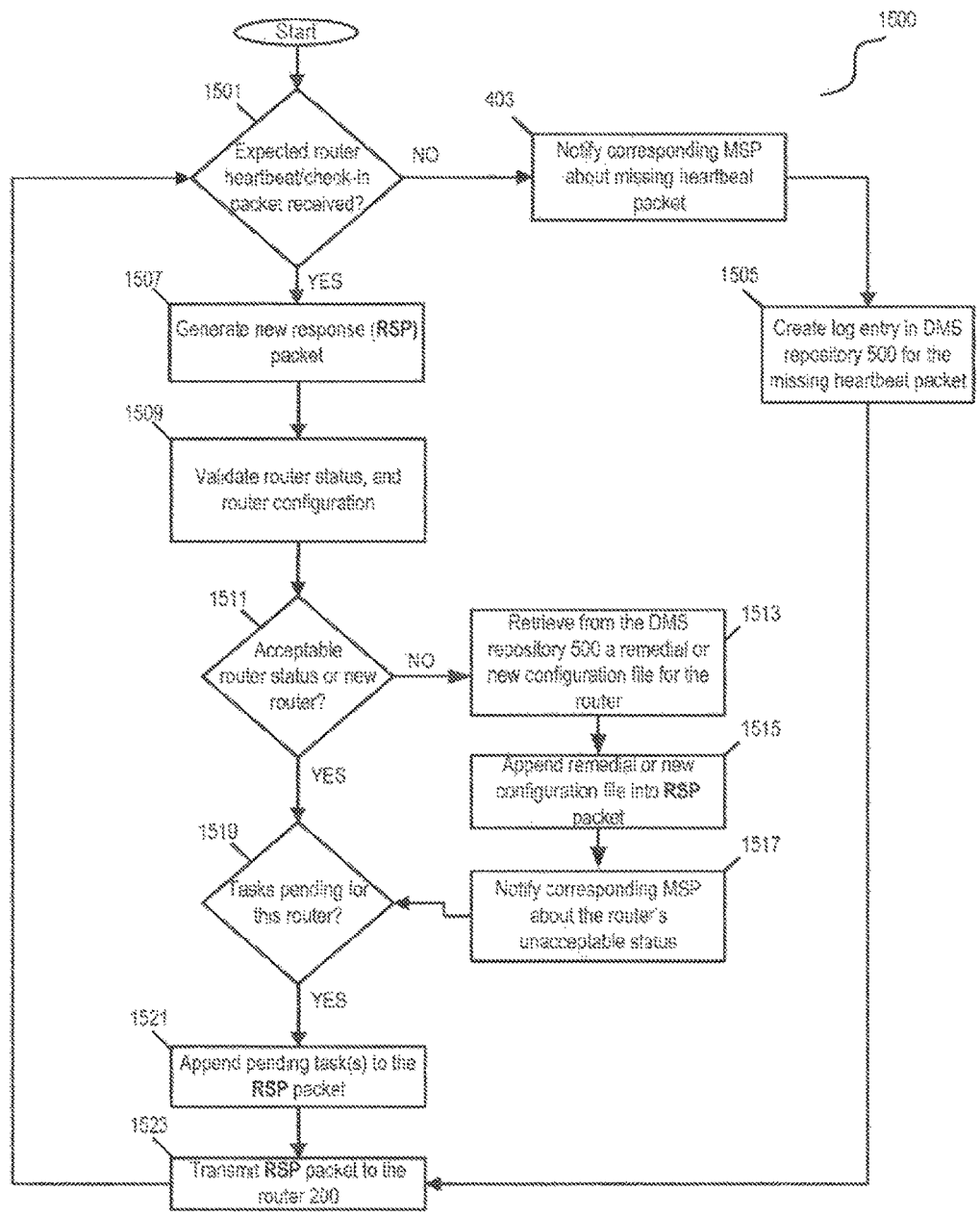
FIG. 15 shows an example of a logic flow to monitor and recover a malfunctioning web-based router, e.g., MRR Component 1500.
Figure 16:
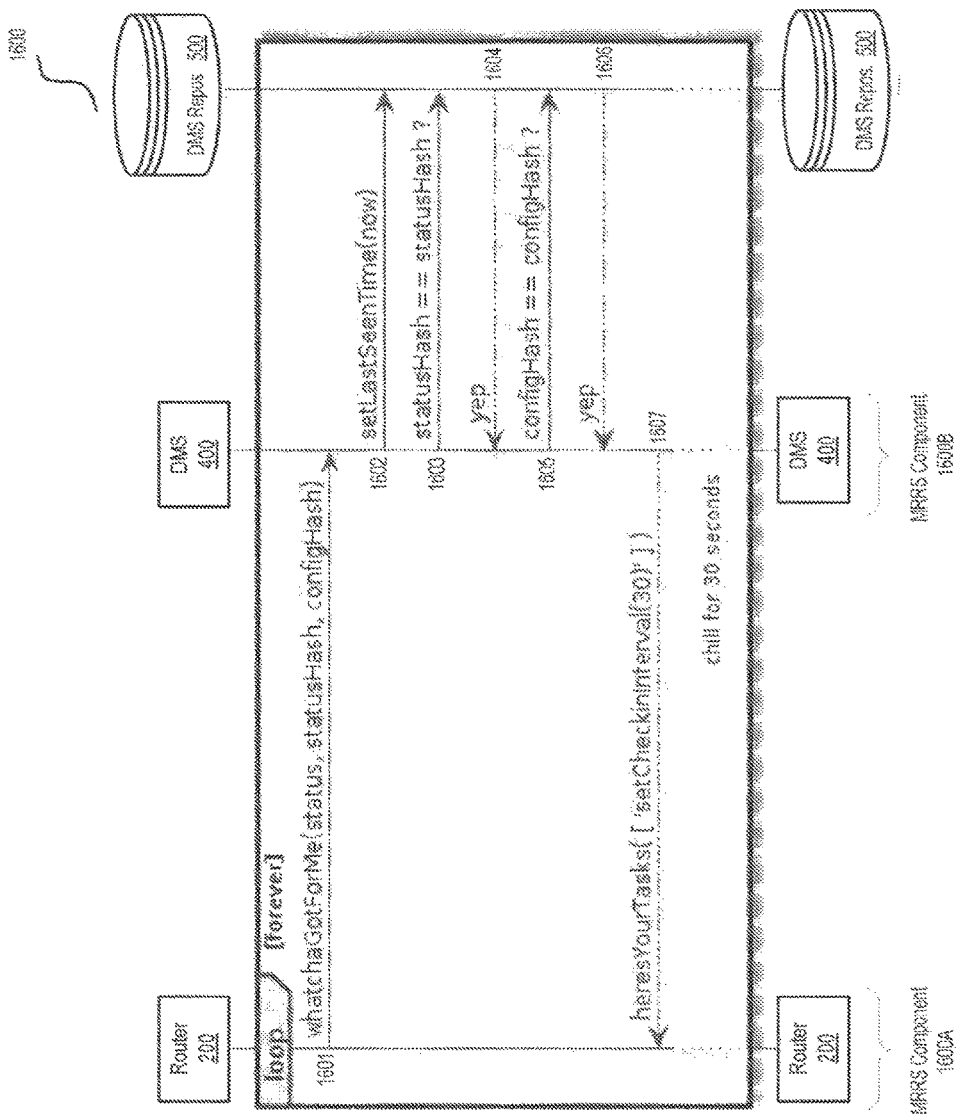
FIG. 16 shows an example of a logic flow for the synchronous reception and processing of a web-enabled router heartbeat packet, e.g., MRRS Component 1600.

The DMS server processes each of the received packets 611 via the MRR Component 1500 and the MMRS Component 1600B, further described with respect to FIG. 15 and FIG. 16. Thereafter, the DMS server 400 generates a log entry 606 in the DMS repository 500 for each the received router heartbeats and retrieves from the repository 500 any pending task scheduled to be executed by the router(s).

Each of the heartbeats 606 comprise information regarding the status of the router transmitting the heartbeat, for example, one or more performance metrics, recent configuration changes made to the router, and/or hash codes representing current status and current router configuration. The received hash codes are used by the DMS server 400 to determine any recent changes on the router status and/or configuration. The determination of a change in the status or configuration is made by the DMS server 400 can be made, for example, by comparing the received hash codes against hash codes received in a previous iteration of the heartbeat reception cycle.

In some implementations, whenever an anomaly or configuration change in a router is identified by the DMS server 400, the server 400 can send a notification 610 to the corresponding MSP user 113. The notification can inform the MSP user 113 about status and any significant changes in the one or more routers in a fleet.

In some further implementations, the DMS server 400 can implement an auditing system by keeping track of when each of the routers in the fleets 604 and 606 send a heartbeat to the DMS server 400. The DMS server 400 can keep a roster of the active routing devices on each fleet. In some implementations, the heartbeats 606 can include snapshots and/or other type of backup files representing the state of their operating systems, software, data, and file systems.

In a further embodiment, the DMS server 400 can determine configuration changes and performance metrics in one or more routers by extracting routers identification numbers included in the heartbeats 606. For example, the heartbeat 606 can comprise a collection of values for a plurality of router performance metrics and descriptive statistics corresponding. Based on these metrics the DMS server can calculate additional metrics for a fleet or groups of routers. The DMS server 400 can also maintain a mirror image of the operating system, software, data, and file organization of each of the managed routers. The mirrored image can be available at request.

FIG. 6B shows the detection of a new router in a fleet. In some implementations, the DMS server 400 can detect when a new router is connected to a fleet of routing devices and upon detection configure the new router at a remote local area network. For example, as previously described the MSP user 113 can make a selection of atomic settings for a new router configuration 613. A request to generate and retain new router configuration 615 is sent by the MSP configuration interface 300 to the DMS server 400. The DMS server 400 generates the requested router configuration profile 631 via the RCON Component 900, further described with respect to FIG. 9 and retains the profile until a heartbeat packet is received from the new router.

Thereafter, the end-user 112 can connect a new router 200 to his/her local area network. The router 200 generates and transmits an asynchronous heartbeat 625 to the DMS server 400 via the SCHK Component 1400, and the MMRA Component 1700A, further described with respect to FIG. 14 and FIG. 17.

The router 200 can then be eventually detected by the DMS server 400 upon the reception of the asynchronous heartbeat 625. The asynchronous heartbeat comprises a unique identifier which is used by the DMS server 400 to determine that the new router 200 has check-in for the first time and that a pending configuration task is waiting on a queue for the router 200. Accordingly, in response to the heartbeat 625 the DMS server 400 sends a task 627 to install the retained configuration profile generated in step 631. Thereafter, the router 200 installs the received router configuration profile 629 via the IRP Component 400, further described with respect to FIG. 4.

As previously described, the router 200 can send a new heartbeat packet to the DMS server 400 indicating the outcome of the installation of the configuration profile received in step 627. The DMS server 400 can then send a notification to the MSP configuration interface 300 (not shown in FIG. 6B) comprising information about the new router including but not limited to router identification codes such a media access control (MAC) address, internet protocol address, and current atomic configurations. Additionally the new router notification can also include performance metrics and the results of a plurality of functionality tests.

The generated configuration profile can be sent to a remote routing device, for example, the router 200. An example configuration profile, substantially in the form of an HTTP(S) POST message including XML-formatted data, and JavaScript Object Notation (JSON) is provided below:

```
POST /configuration_profile.php HTTP/1.1
Host: www.router1nClient.com
Content-Type: Application/XML
Content-Length: 524
<?XML version = "1.0" encoding = "UTF-8"?>
<fallback_Configs>
     <e_configProfile>B2BA50000</emergency_configProfile>//memory
address
     <remote_failover>177.201.253.160</remote_failover>//WAN Machine
     <local_failover>192.168.1.169</local_failover>//LAN Machine
</fallback_Configs> // In an emergency load e_configprofile and
call home
<configuration_profile>
     <timestamp>2020-12-12 17:22:43</timestamp>
     <user_name>Joe Doe</user_name>
     <resellerId>919E985711</resellerID>
     <is_preconfig>TRUE</is_preconfig>
     <preconfigDate>2020-10-03</preconfigDate>
     <overrideLocalAdminUser>FALSE</overrideLocalAdminUser>
     <user_credentials>
          <password>secretpass1234</password>
          <private_key>h767kwjiwnfe456#@hnniimidrtsxbi</private_key>
     </user_credentials>
  <router id= 2121>
     <model>DT3228</model>
     <manufacturer>Datto</manufacturer>
     <memory> 355328K/37888K</memory>
     <cpu>SB-11@700MHz</cpu>
     </router>
<!- scripts to set one or more atomic configurations ->
<network_interfaces language=PHP>
//JSON feeds set a permanent and transient network interface
  {
          "dc1": {
               "registration": "permanent",
               "interfaces": {
                    "LAN": (
                         "mac": "0025908fbe4c", // MAC address with all
symbols removed
                         "reservations": [
                              3232235786          // IPv4 address in base 10
notation (see inet_aton(3))
                         ]
                    }
               },
               "lastSeen": (
                    "time": 1414524713,
                    "interface": "0025908fbe4c",
                    "IPv4": 3232235786
               )
          },
          "unknown-0025908fbe4d": {
               "registration": "transient",
               "interfaces": [ ],
               "lastSeen", (
                    "time": 1414612435,
                    "interface": "0025908fbe4d",
                    "IPv4": 3232235786
               }
          }
}
</network_interfaces>
<port_forward>
//JSON feeds port forwarding configurations
{
          "ba635986-e8cd-e3f5-2600-5bf919708ea8": {
               "host": "dc1",                  // hostname defined in
devices, or looked up in DNS
               "protocol": "tcp",              // may be "tcp" or "udp"
               "inport": 3390,                 // Port on the external
interface
               "outport": 3389                 // Port on the target host
          }
}
</port_forward>
</configuration_profile>
```

The router 200 can install the received configuration profile and thereafter send a check-in heartbeat packet to the DMS server indicating the results of the installation.

Figure 7:
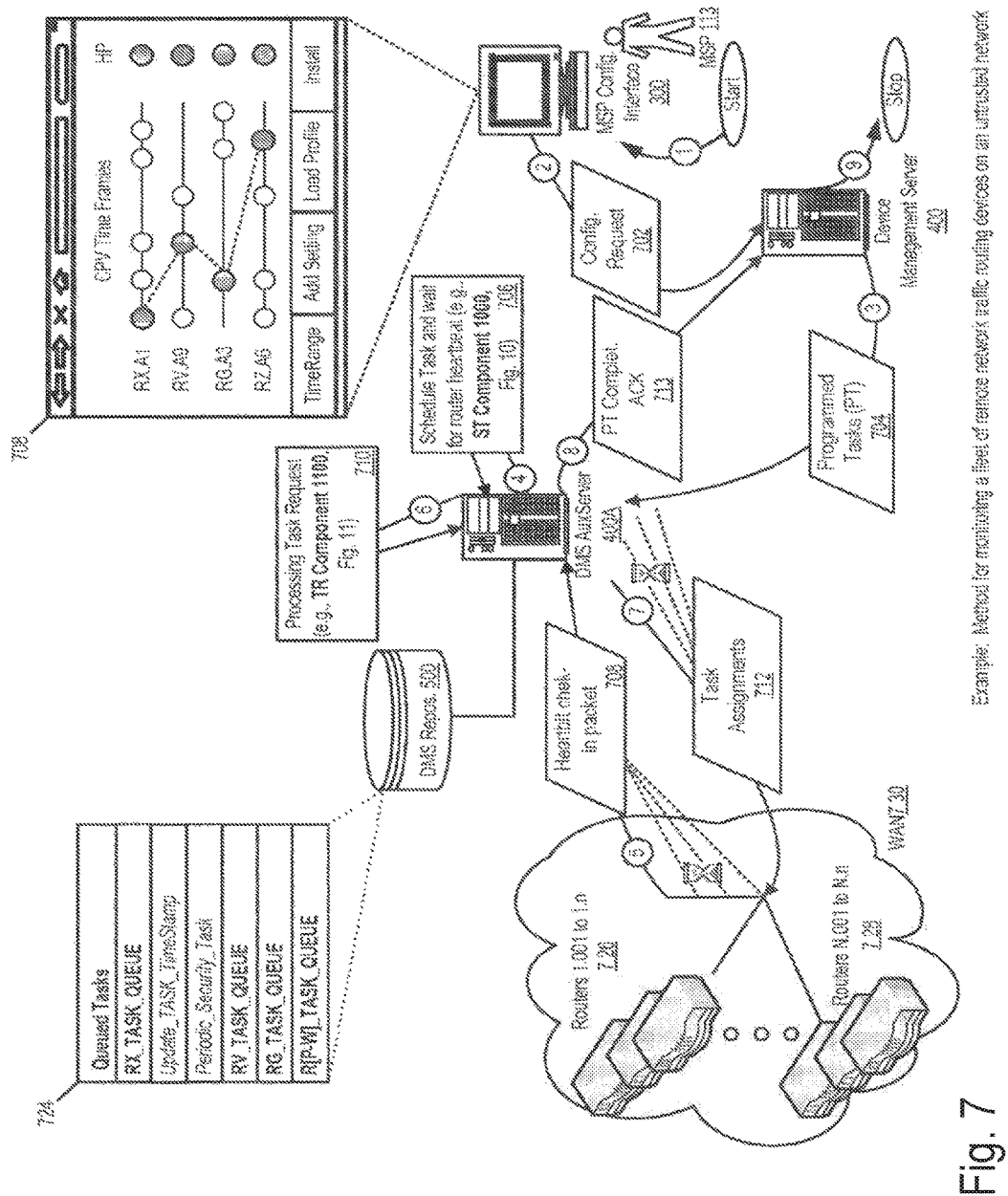
FIG. 7 show an example of a data flow example for monitoring a fleet of remote network traffic routing devices on an untrusted network.

FIG. 7 show an example of a data flow for monitoring a fleet of remote network traffic routing devices on an untrusted network. In one embodiment, the MSP user 113 can send a configuration request 702 to the DMS server 400. Such a configuration request may comprise one or more atomic settings that should be installed and/or updated on a fleet of routing devices for example 726 or 728. The configuration request can also comprise at least one identifier for a targeted fleet and/or routing device.

The DMS server 400 can send the configuration request in a programmed task packet 704 to a message queuing (MQ) server hereinafter DMS AuxServer 400A. The AuxServer 400A can be implemented as a message broker server for example a server implementing advanced message queuing protocol (AMQP). The AuxServer 400A can temporarily store the programmed tasks for one or more of the routing devices and/or routing devices fleets. The AuxServer 400A can schedule each of the received programmed tasks 724 through the scheduling task ST Component 1000, further described with respect to FIG. 10. Moreover, the DMS server 400 can be subscribed to one or more tasks queues maintained by the AuxServer 400A which will serve as sources of tasks that have to be executed by each of the subscribed routers. The tasks can be ordered in a first-in-first-out, last-in-first-out fashion and the like organization methods. Tasks can also be ordered by a priority order and/or programmed to be executed after a predetermined time. The AuxServer 400A can maintain the queued tasks 724 in the DMS repository 500.

The managed routers can send a heartbeat periodically 708 to the AuxServer 400A. The AuxServer 400A processed the received heartbeat packets 708 through a Task Request Component 1100, further described with respect to FIG. 11. The AuxServer 400A can then locale a task (if applicable) for each of the received heartbeat packet 708 and send a task assignment response 712 with a script and/or oilier processor executable instruction to be performed by a specified router, by a specified fleet of routing devices or by other devices connected to the local area network where a router is installed.

A router and/or a fleet of routers can send a report to the AuxServer 400A of a performed task in a subsequent heartbeat packet 708. For example, a router in the fleet 726 can transmit a heartbeat 708 with an indicator confirming the execution of one or more tasks. After a task has been confirmed by the assigned router, the AuxServer 400A can transmit a programmed task completion acknowledgement 713 to the DMS server 228.

In an alternative embodiment instead of waiting for a router to transmit a heartbeat packet 708 to the AuxServer 400A, the AuxServer 400A can proactively send a task assignment message to one or more of the routers in the fleets 726 or 728 whenever the AuxServer 400A receives a new task to be executed by the one or more managed routers. Accordingly, the one or more routing devices can periodically or asynchronously transmit a message to the AuxServer 400A whenever an assigned task has been performed.

Figure 8:
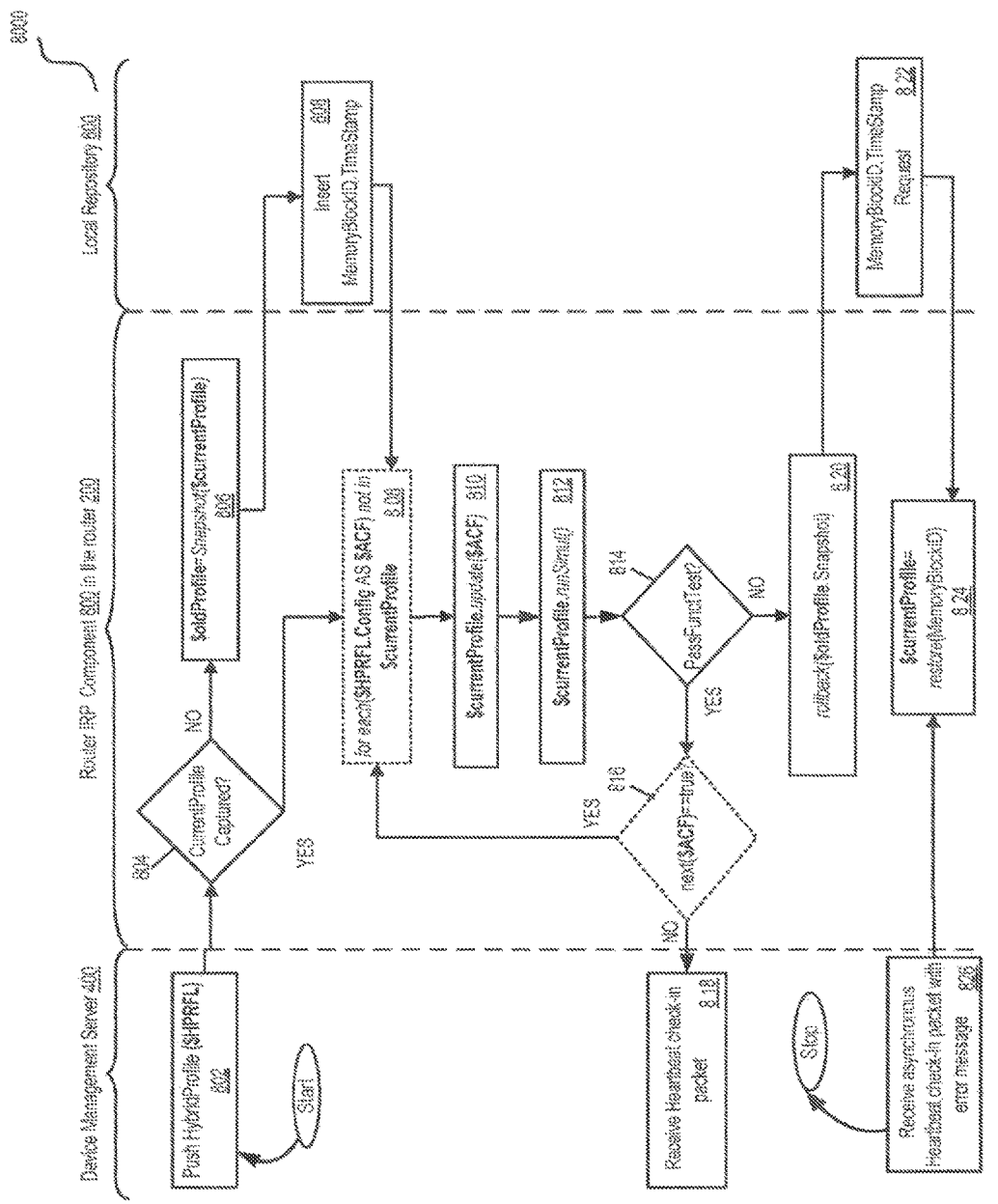
FIG. 8 shows an example of a logic flow for the installation and test of a hybrid profile, e.g., IRP Component 800.

FIG. 8 shows an example of a logic flow for the installation and test of a hybrid profile, e.g., IRP Component 800. In one embodiment, the router 200 can receive the hybrid profile 802 from the DMS server 400. Once the hybrid profile 802 is received, the router 200 can determine if the configuration profile that is currently installed in the router 200 has been registered or captured 803. If the current configuration profile has not been captured, then the router 200 performs a snapshot of the current profile 804 to use as a backup and/or to be used as requested for example in a failover situation. In addition, a memory block identification number and a time stamp 806 are stored in the local repository 600 containing all the information to instantiate a duplicate of the configuration profile or parts of the configuration profile as it is currently installed in the router 200. In other embodiments, for example, when an indexed database is utilized as part of the local repository 600, the current configuration profile can be saved in a new database record or alternatively, when a version control system is utilized as part of the repository 600, the current profile can be identified as an old version of the router 200 while the new hybrid configuration profile is registered or recorded as the new configuration or version of the router 200.

Once it is determined that the current profile has been already captured or stored in the local repository 200, a cyclic process 808 begins to determine which atomic settings should be modified as specified in the hybrid configuration profile 802. In one embodiment, the atomic settings that do not correspond to the atomic settings specified in the hybrid profile 802 are changed individually and/or one at the time 810. Each time an atomic setting is changed, a battery of functional and performance tests can be performed over the router 200 in a simulation environment or under real conditions 812. If the instance of the router 200 does not pass one or more of the specified functional and performance tests during the emulation or under real conditions (e.g., "critical" functional and performance tests 814), the router 200 can execute a rollback command 820 for the snapshot containing the old profile or one or more atomic settings of the old profile. The rollback command 820 can retrieve a memory block 822 with an instantiate CPV corresponding to the old profile or last active configuration profile registered for the router 200. Accordingly, atomic settings or the old or previous configuration profile can be restored 824 on the router 200 as required. The router 200 can send an error report signal or message 826 comprising all the atomic settings from the hybrid profile that were successfully installed. Additionally, the error report 426 can include the results of the performed functional and performance tests, including the last atomic setting installed on the router 102 before failure.

Alternatively, when all the atomic settings are modified as specified in the hybrid profile 802 and the router 200 has successfully passed the corresponding functional and performance tests 816. An indicator (for example, a heartbeat signal 418) can be sent to the DMS server 400 to indicate that the hybrid profile has been successfully installed and comprising information regarding the results obtained from the applied battery of tests. In other alternative embodiments, the atomic settings can be modified all at once and the battery of functional and performance tests can be applied only once. The router 200 can provide an error report upon the failure of router 200 to one or more of the critical tests or a heartbeat if it passes all the tests.

Figure 9:
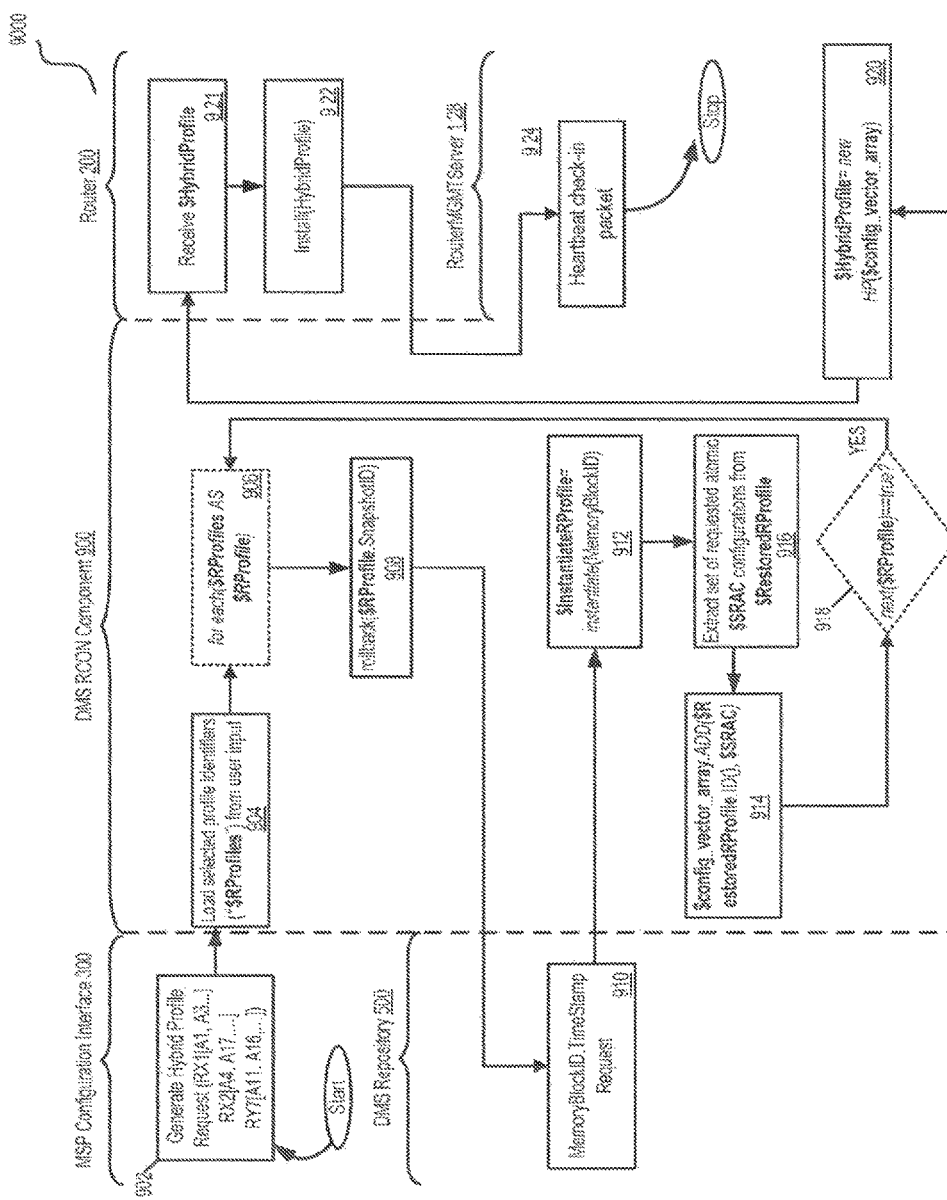
FIG. 9 shows an example of a logic flow for the generation of a hybrid router configuration profile, e.g., RCON Component 900.

FIG. 9 shows an example of a logic flow for the generation of a hybrid router configuration profile, e.g., RCON Component 900. In one embodiment, the MSP user 113 can specified a set of identifiers of atomic settings from one or more CPVs and transmit a router configuration request 902 to the DMS server 400 via the MSP configuration interface 300. The DMS server 400 can receive such a selection and load the identifiers for the selected profiles or CPVs in an array or an equivalent data structure 904. Thereafter, a cyclic process can begin 906 wherein a rollback command for the snapshots corresponding to each to the selected CPVs is executed 908. After the rollback command is called, a memory block 910 comprising a CPV that was installed in a routing device or fleet at a specific point in time is retrieved from the DMS repository 500. The CPV comprised in the retrieved memory block 910 can be instantiated 912 to extract the values of the selected atomic settings 916. A CPV identification number and a set of selected atomic settings from the CPV can be stored in a data structure (for example, an array of vectors 914) each time an atomic configuration is extracted from an instantiated CPV.

Once all the specified atomic settings have been retrieved 918, a new hybrid profile is generated 928 utilizing the atomic settings stored in the array of vectors 914. Thereafter, the generated hybrid profile 920 is sent to the router 200. The router 200 can then install the hybrid profile 822 and a heartbeat 824 can be sent to the DMS server 400 to indicate the outcome of the installation of the hybrid profile. The DMS repository 500 can alternatively or additionally utilize a revision control system and/or an indexed database to retrieve the CPVs and atomic settings specified by the MSP user 113.

Figure 10:
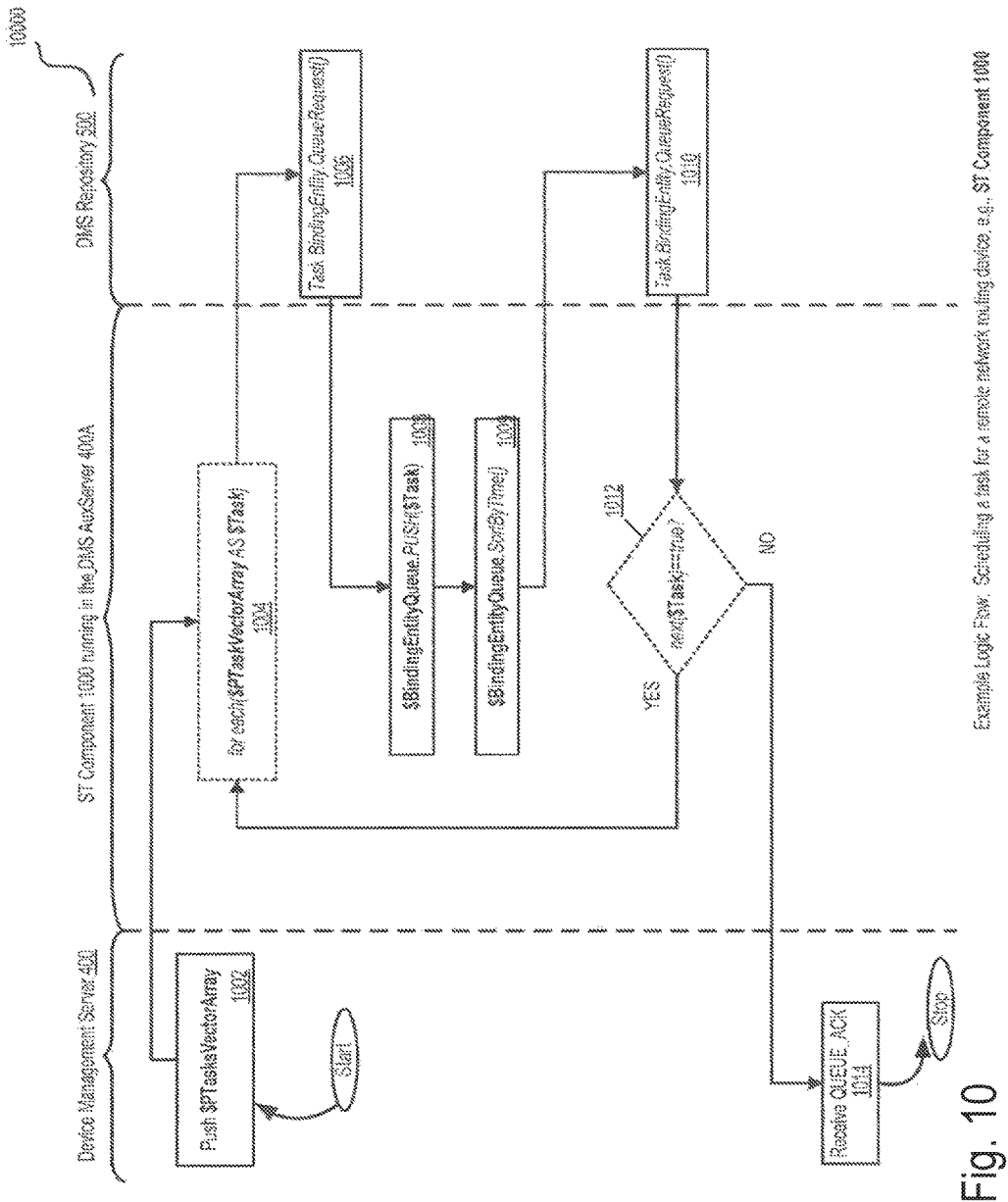
FIG. 10 shows an example of a logic flow for scheduling a task for a remote network routing device, e.g., ST Component 1000.

FIG. 10 shows an example of a logic flow for scheduling a task for a remote network routing device, e.g., ST Component 1000. In one embodiment, the DMS server 400 can send a data structure to the AuxServer 400A containing a list of tasks 1002 to be processed by one or more routers managed by the DMS server 400. The data structure can be for example an array of vectors wherein each vector includes an identifier for the router or devices that should perform the task and a script with processor executable code corresponding to one or more tasks.

The AuxServer 400A can initiate a cyclic process 1004 wherein each task is added to a task queue with task to be performed by one or more routers. For example, after determining which router or devices are associated with a received task, the AuxServer 400A can retrieve one or more tasks 1006 from the DMS repository 500 which can contain one or more tasks to be executed by one or more routers or other computing devices connected to the LAN hosted by a router. Once the task is retrieved a corresponding task packet can be pushed into the queue 1008, and thereafter the tasks in the queue can be sorted by a plurality of criteria 1009. For example, the tasks can be configured to be executed at a specific time and can be sorted by execution time, alternatively or additionally the tasks can be sorted by priority levels. In some instances the tasks can follow a stack policy for example first-in-first-out, last-in-first-out and the like policies. After the new task has been added to the corresponding queue 1012 and the queue has been sorted, the AuxServer 400A can store the updated task queue 1010 in the DMS repository 500. The AuxServer 400A can send an indicator 1014 to the DMS server 400 indicating that the task(s) have been added to their corresponding queues.

Figure 11:
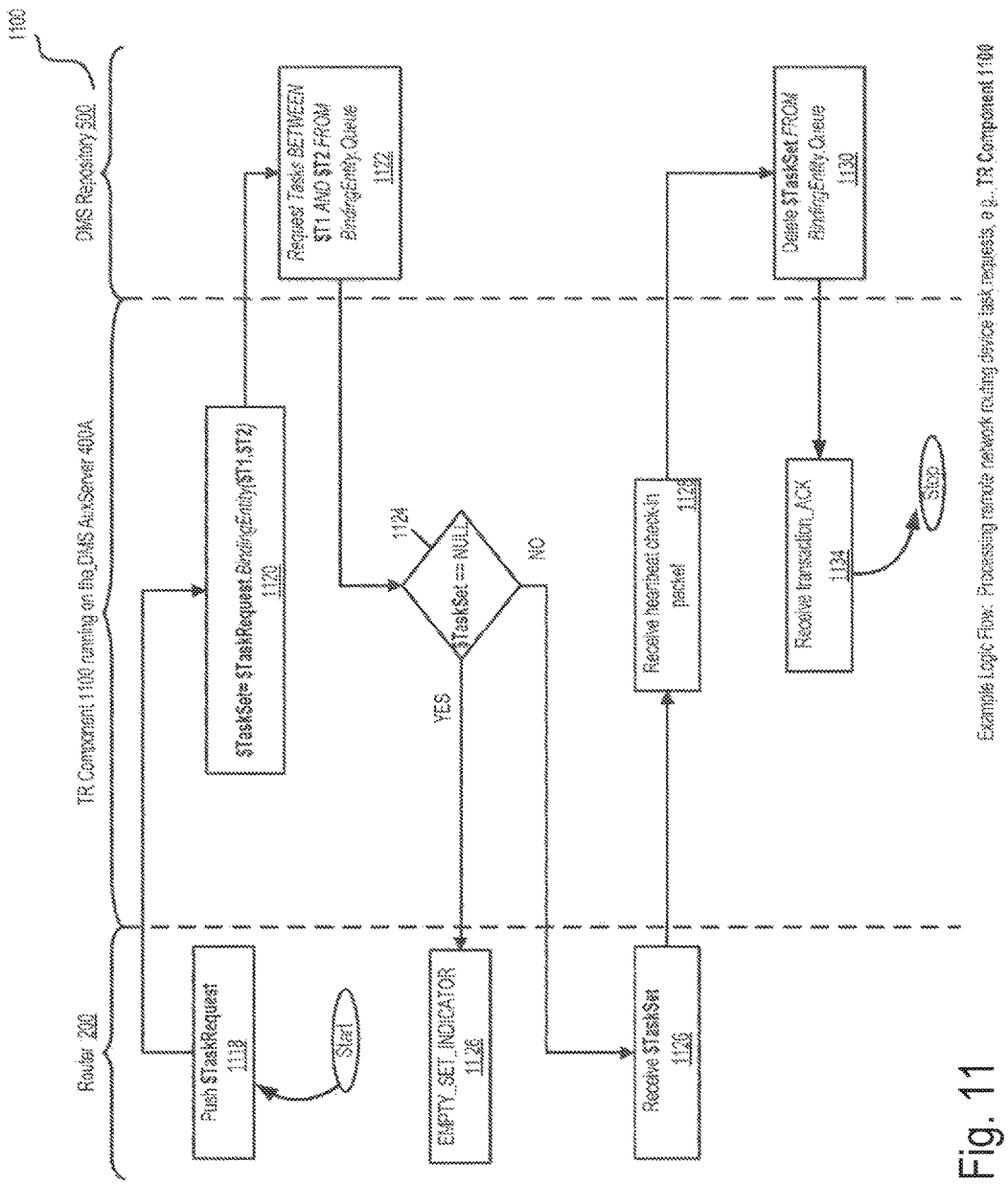
FIG. 11 shows an example of a logic flow for processing remote network routing device task requests, e.g., TR Component 1100.

FIG. 11 shows an example of a logic flow for processing remote network routing device task requests, e.g., TR Component 1100. In one embodiment, the router 200 can send a task request 1118 to the AuxServer 400A. The AuxServer 400A can execute a command to retrieve one or more tasks scheduled at a time within a range specified for example by the times ST1 and ST2 in 720. Thereafter, the corresponding task set 1122 can be retrieved from the DMS repository 500. If the retrieved task set is empty 1124, that is, there is no task scheduled for the Router 200 between the specified times, then an output 1126 can be sent to the Router 200 indicating that the Router 200 has no pending tasks to be performed for the given time range.

When there are one or more tasks to be executed for the indicated time range, then the retrieved task set 1128 is sent to the Router 200. The Router 200 can perform the requested tasks or alternatively the Router 200 can push the tasks contained in the task set 1128 to a local queue of scheduled tasks. Thereafter, the Router 200 can send a heartbeat 1130 to the AuxServer 400A indicating that the tasks were performed and/or that the tasks were received. The AuxServer 400A can remove the tasks included in the task set 1128 from the corresponding task queue 1132 upon receiving the router heart beat 1130. The DMS repository 500 can send a transaction acknowledgement 1134 to the AuxServer 400A once the indicated tasks have been removed from the corresponding queue.

Figure 12:
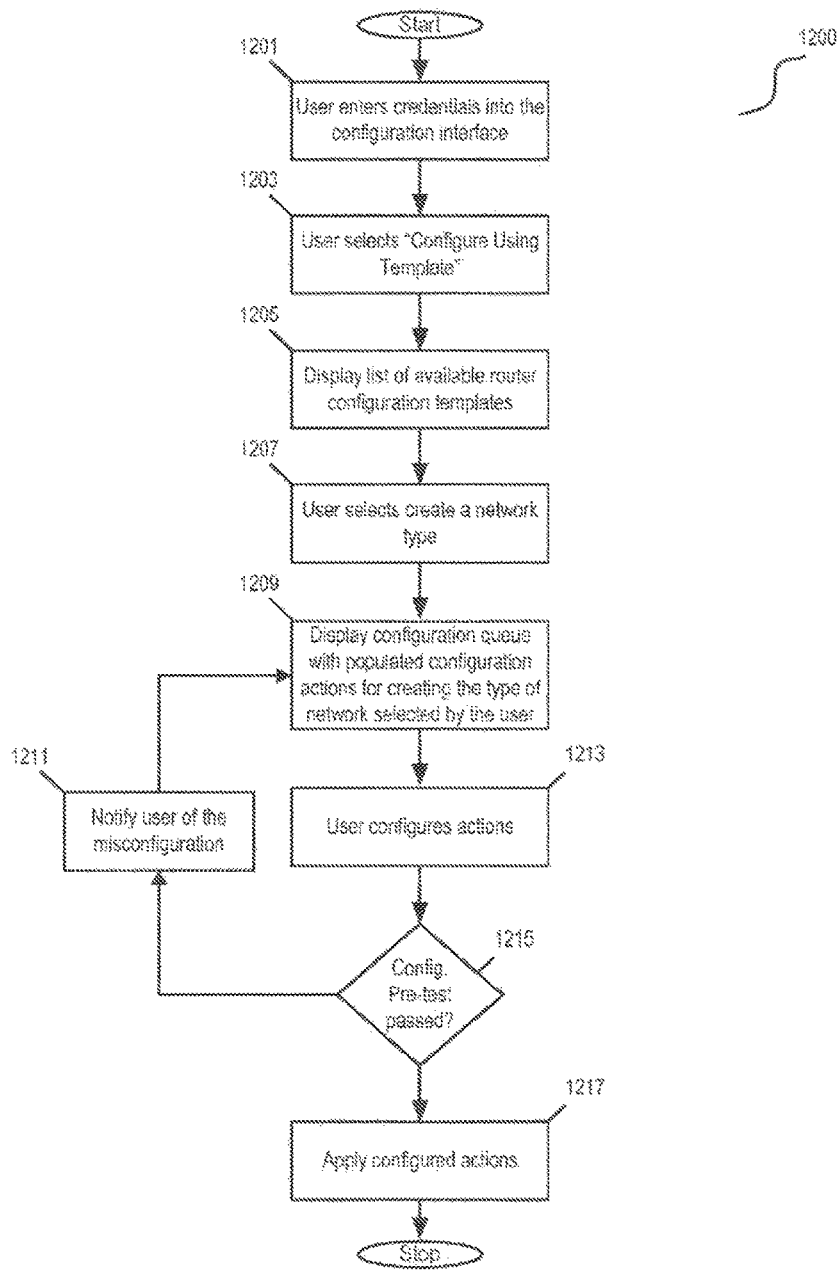
FIG. 12 shows an example of a logic flow for a web-enabled router configuration via a smart template, e.g., TBC Component 1200.

FIG. 12 shows an example of a logic flow for a web-enabled router configuration via a smart template, e.g., TBC Component 1200. In some implementations, the TBC component 1200 can be running as part of the MSP portal 4011 and/or as pan of a local configuration interface e.g., 700A and 700B in FIG. 1. The user can enter his/her credentials into the user interface 1201. Then the user can select a configuration template 1203 to; for example, configure a local area network, a guest network, a wide area network and the like configurations. Accordingly a collection of configuration templates is displayed 1205 for the user to choose. Thereafter the user can select a type of template 1207 which results in the display or render of a queue with configuration tasks 909 (also shown in FIG. 23) to guide the user over the selected router configuration.

The tasks list on the queue can be completed by the user through multiple configuring actions 1213. Each time the user completes a configuration task, a pre-test is performed and a conditional statement 1215 is executed if the pre-test is not passed then the user interface notifies the user that a configuration field needs to be corrected (see FIG. 19). Otherwise, the configuration is shown as applied and the user can proceed to the complete the next task in the queue.

FIG. 13 shows an example of a logic flow for a reliable web-enabled router configuration internal process, e.g., ICONF Component 1300. In some implementations, a router 200 can receive a router configuration task 1301 from the DMS server 400. Thereafter, the router 200 takes a snapshot of the active configuration profile 1303 (i.e., the configuration profile currently installed in the router) and labels the snapshot as the previous version of the configuration profile.

In some implementations, the router 200 installs the new router configuration profile 1305 and executes a performance/reliability test 1307 of the router 200 running the new configuration profile. An example of the test 1307 can include testing connectivity to a DMS server. If the test indicates acceptable results, then a transmission of a check-in heartbeat packet is initiated 1015, otherwise the router 200 executes an auto-recovery process where the previous configuration profile is rollback and reinstalled in the router or the router factory settings are automatically reinstalled ensuring, for example, connectivity to a DMS server.

Figure 14:
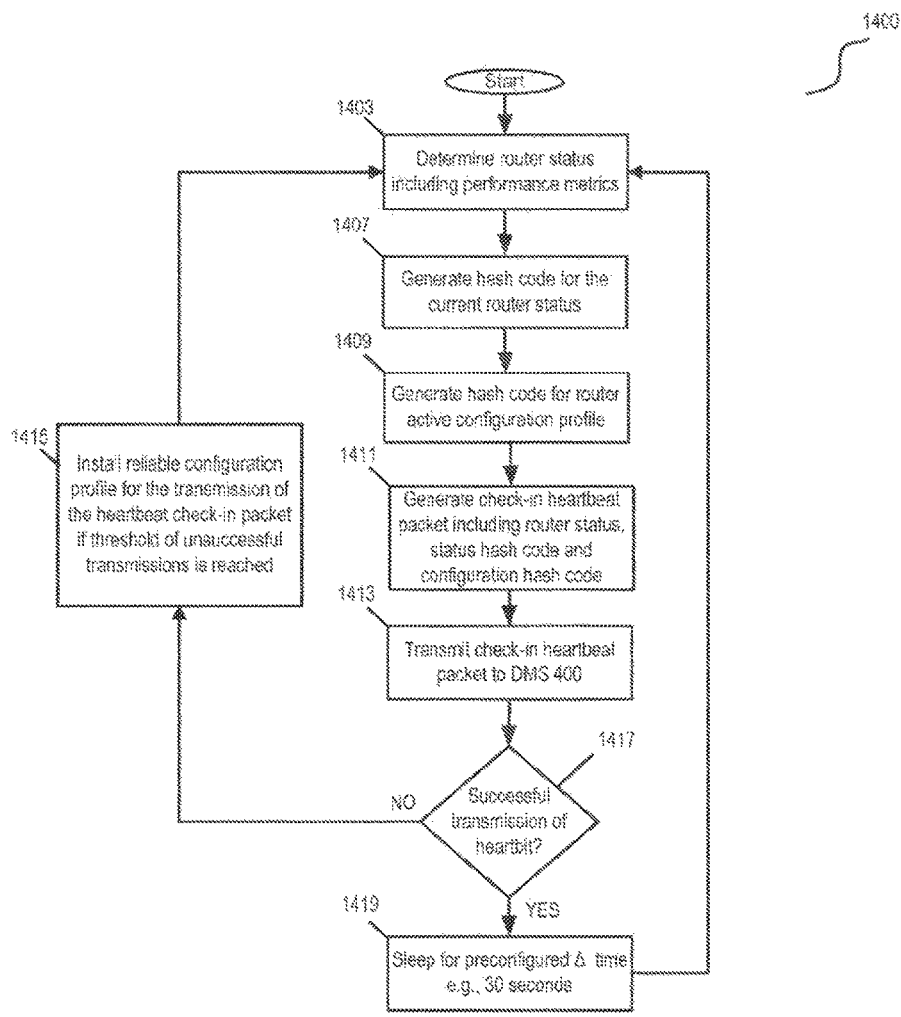
FIG. 14 shows an example of a logic flow for a reliable transmission of a synchronous check-in heartbeat packet, e.g., SCHK Component 1400.

FIG. 14 shows an example of a logic flow for a reliable transmission of a synchronous check-in heartbeat packet, e.g., SCHK Component 1400. In some implementations, a router synchronously transmits a heartbeat packet to a DMS server. In such a case the router obtains a current router status and/or performance metrics 1401. The router can generate a first hash code for the obtained router status 1405, and a second hash code for the router active configuration profile 1409. Thereafter, the router generates a check-in heartbeat packet including the router status, the hash code representing the router status and the hash code representing the routers active configuration profile 1411.

In some implementations, the router transmits 1413 the heartbeat packet to the DMS server 400. If the packet is transmitted successfully the router sleeps for a Δ time 1419, otherwise the router verifies is a threshold which can be, for example, lime-based or a predetermined number of unsuccessful transmission of packets to the DMS server has been reached 1415. If this threshold is reached, the router can install a failover configuration profile, for example, transmitting packets through an LTE interface ensuring the connectivity and transmission of packets to the DMS server.

FIG. 15 shows an example of a logic flow to monitor and recover a malfunctioning web-based router, e.g., MRR Component 1500. In some implementations the DMS server verifies if an expected heartbeat has been received from one or more routers 1501. If a heartbeat packet was not received at the expected time (expected time can be based on a time threshold) then a notification send to the corresponding MSP user via the MSP portal and/or other medium e.g., text message, email or the like depending on the severity of the delay. Thereafter, a log entry is created documenting that failure of the reception of the heartbeat packet 1505.

If a heartbeat was received then the DMS server generates a response packet 1507. The router status and configuration contained in the received heartbeat, packet are validated 1509. The validation can include validations for synchronous packets as shown in MRRS component 1600B or asynchronous packets as shown in MRRA component 1700B. In some implementations when the received status indicates an unacceptable status, then the DMS server can retrieve a remedial configuration profile 1513 from the DMS repository 500. Append the remedial configuration profile into the response packet 1515 and send a notification 1517 to the corresponding MSP about the unacceptable status and the remedial configuration profile that will be sent to the router. Thereafter, the DMS server 400 appends the remedial configuration profile into the response packet 1521 and the packet is eventually sent to the router.

FIG. 16 shows an example of a logic flow for the synchronous reception and processing of a web-enabled router heartbeat packet, e.g., MRRA Component 1600. In some implementations, the router 200 sends synchronous packets 1601 to the DMS server 400 and these packets are validated by the DMS server 400 through the steps 1602, 1603 and 1605.

Figure 17:
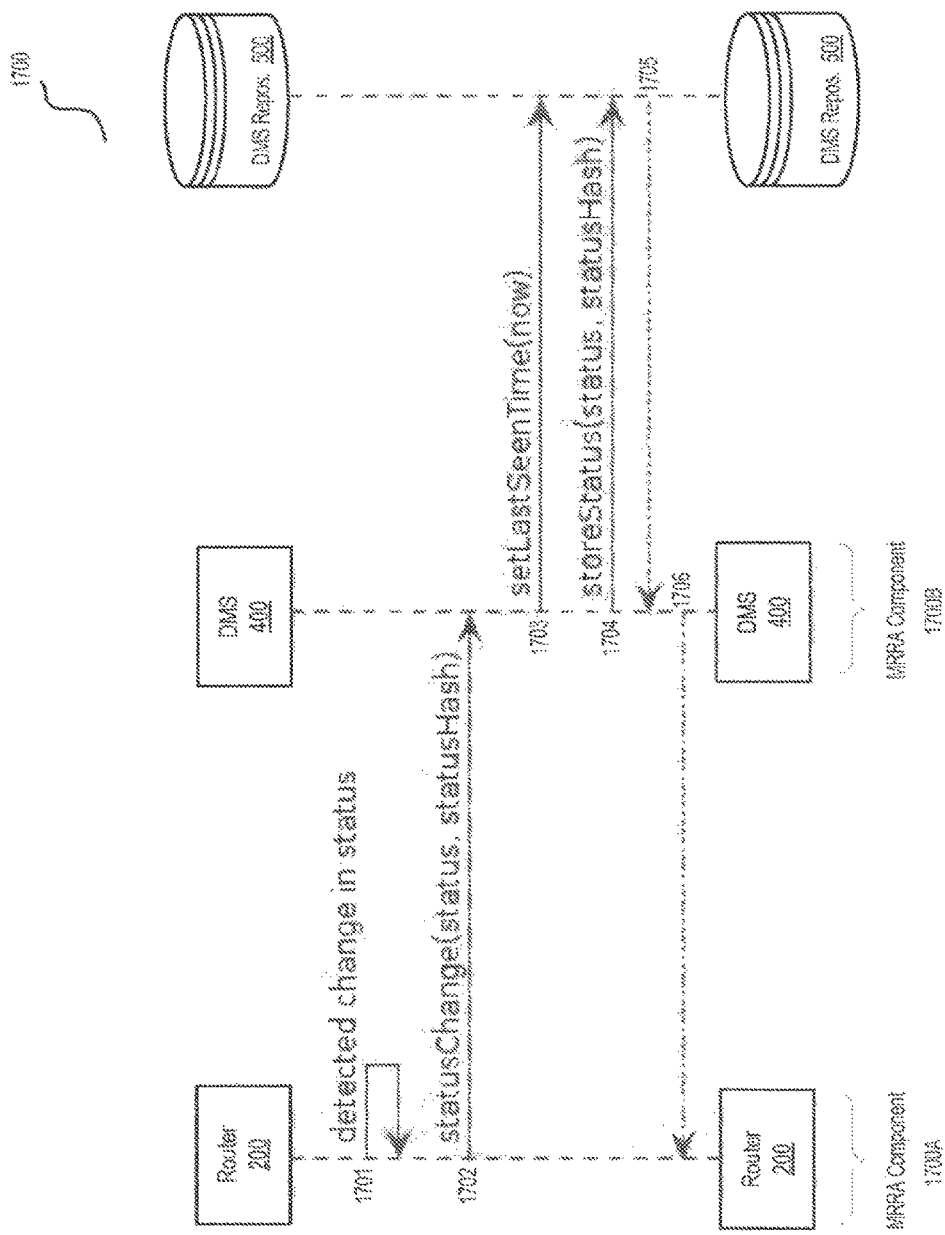
FIG. 17 shows the logic flow for an asynchronous event triggered reception and processing of a web-enabled router heartbeat packet, e.g., MRRA component 1700.

FIG. 17 shows the logic flow for an asynchronous event triggered reception and processing of a web-enabled router heartbeat packet, e.g., MRRA component 1700. In some implementations the router 200 can send asynchronous heartbeat packets 1702 to the DMS server 400 upon the detection of a change on the router status 1702. The DMS server processes these asynchronous packets as shown in steps 1703 and 1704.

Figure 18:
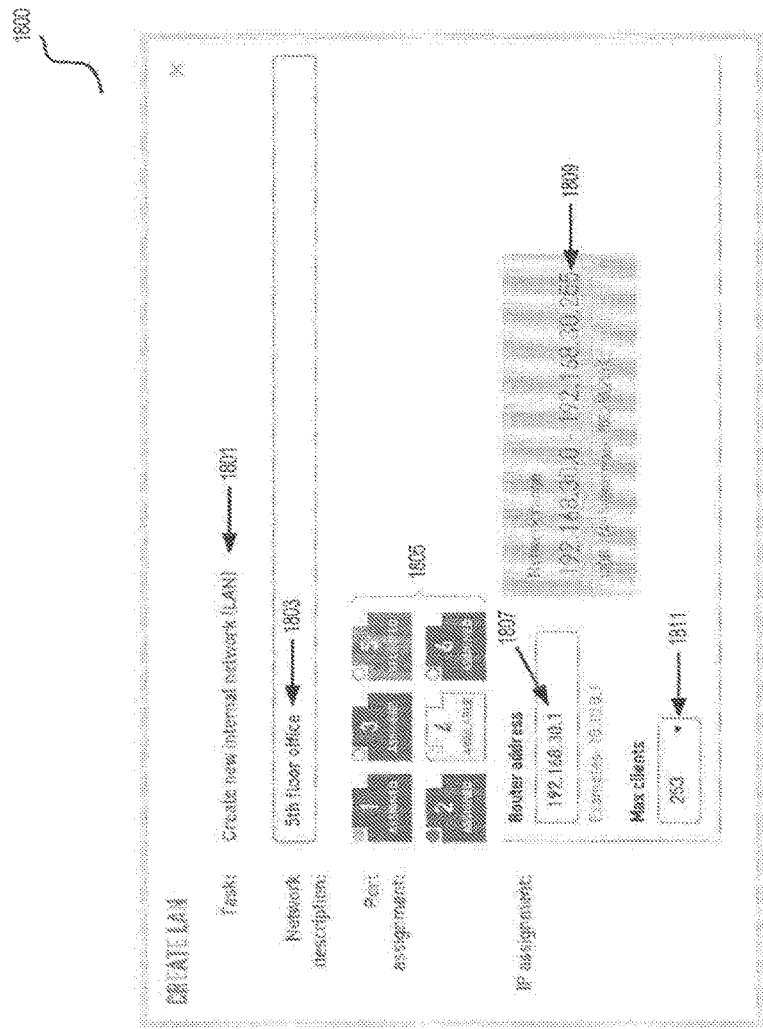
FIG. 18 shows an example of a user interface to configure a local area network of a web-enabled router via a smart template.
Figure 19:
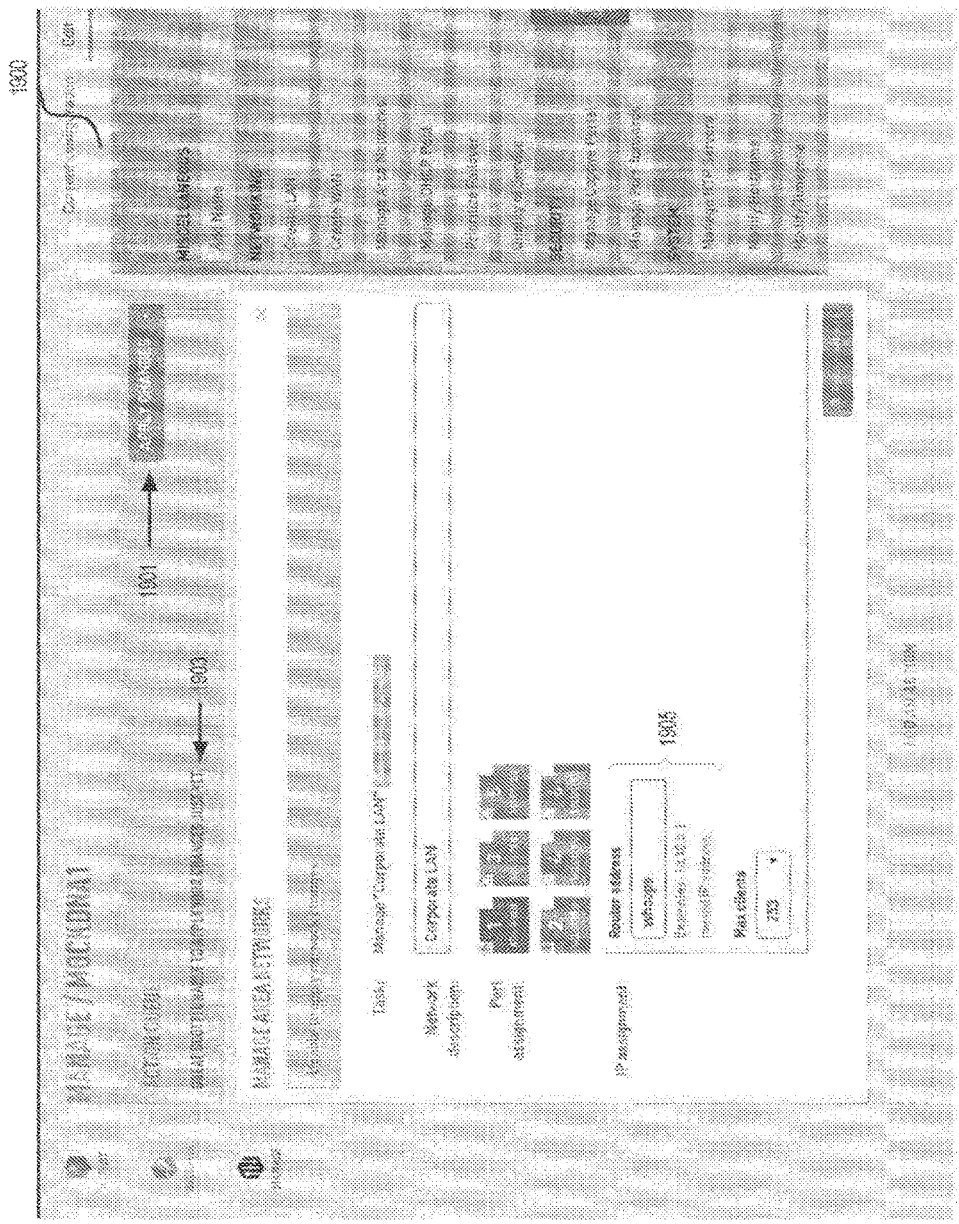
FIG. 19 shows an example of a user interface showing the detection of a user input error during the configuration of a local area network in a web-enabled router.
Figure 20:
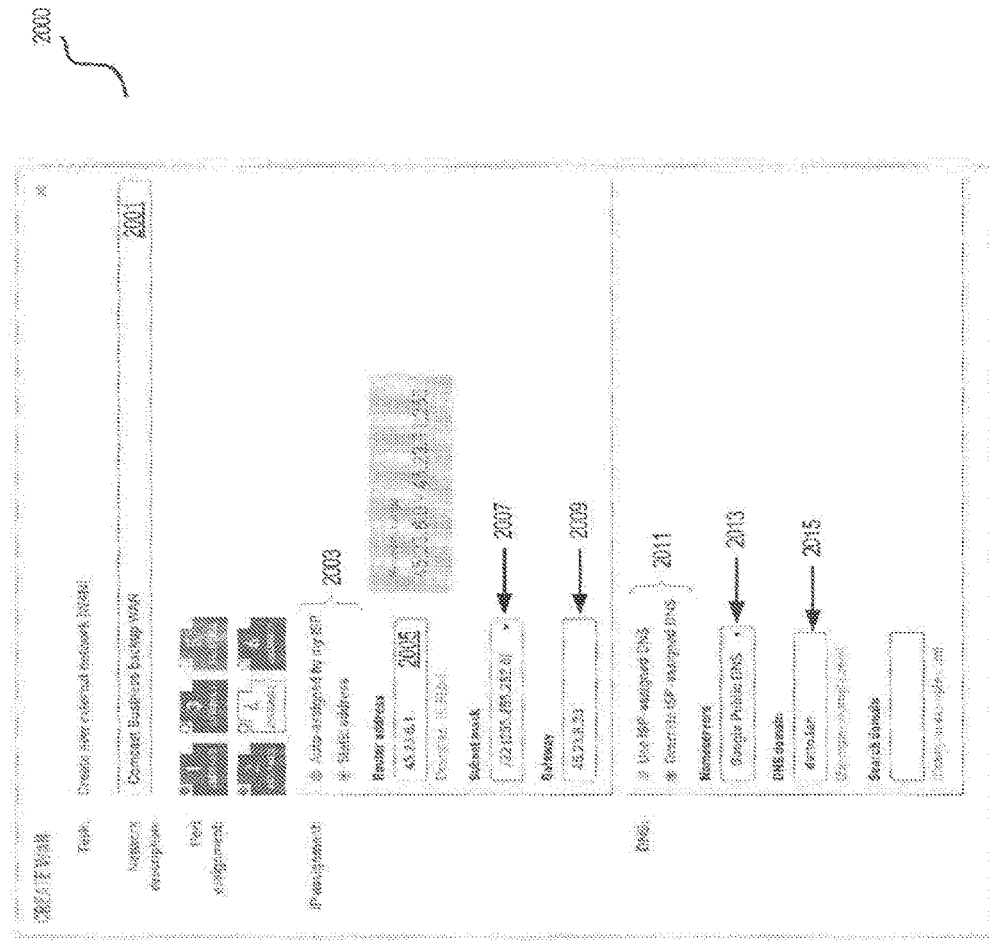
FIG. 20 shows an example of a user interface to configure wide area network Domain Name System settings in a web-enabled router via a smart template.
Figure 21:
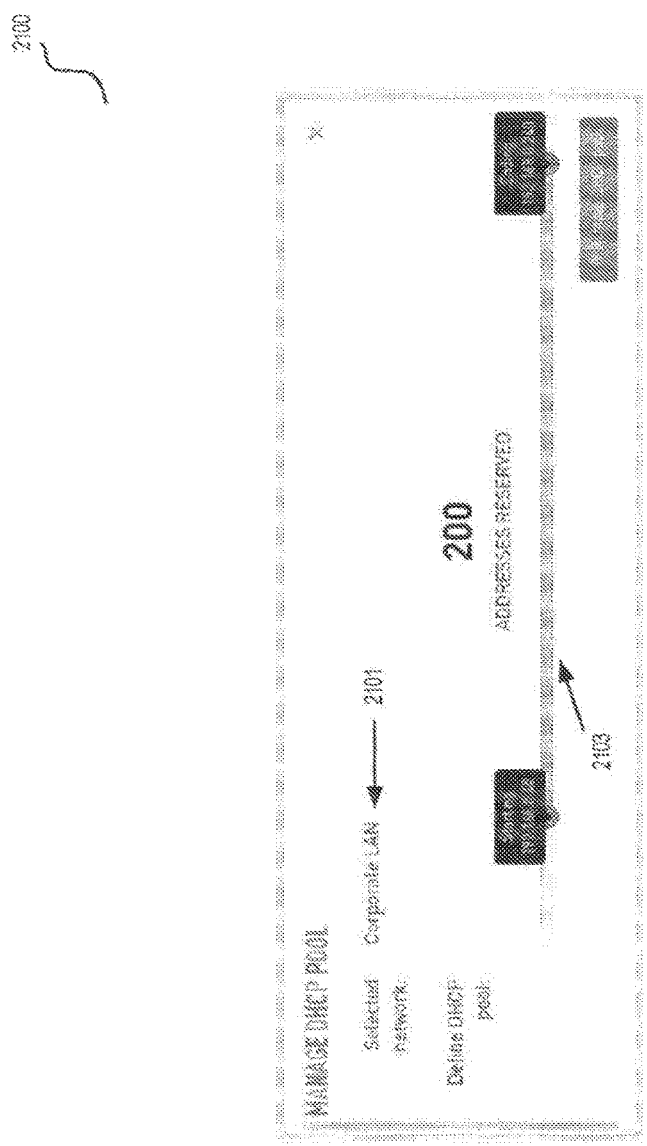
FIG. 21 shows an example of a user interface to select a range of IP addresses for a Dynamic Host Configuration Protocol (DHCP) pool in a web-enabled router.
Figure 22:
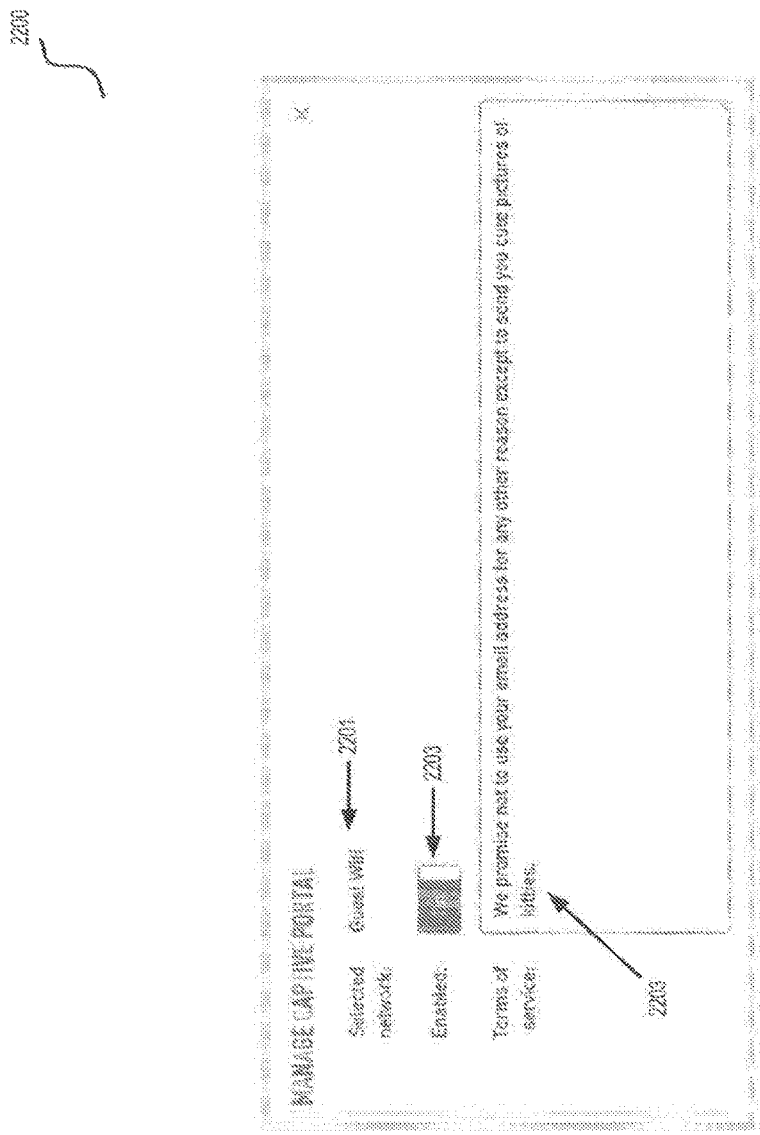
FIG. 22 shows an example of a user interface to set a message with terms of service to be displayed on client devices connected to a guest network of the web-enabled router.
Figure 23:
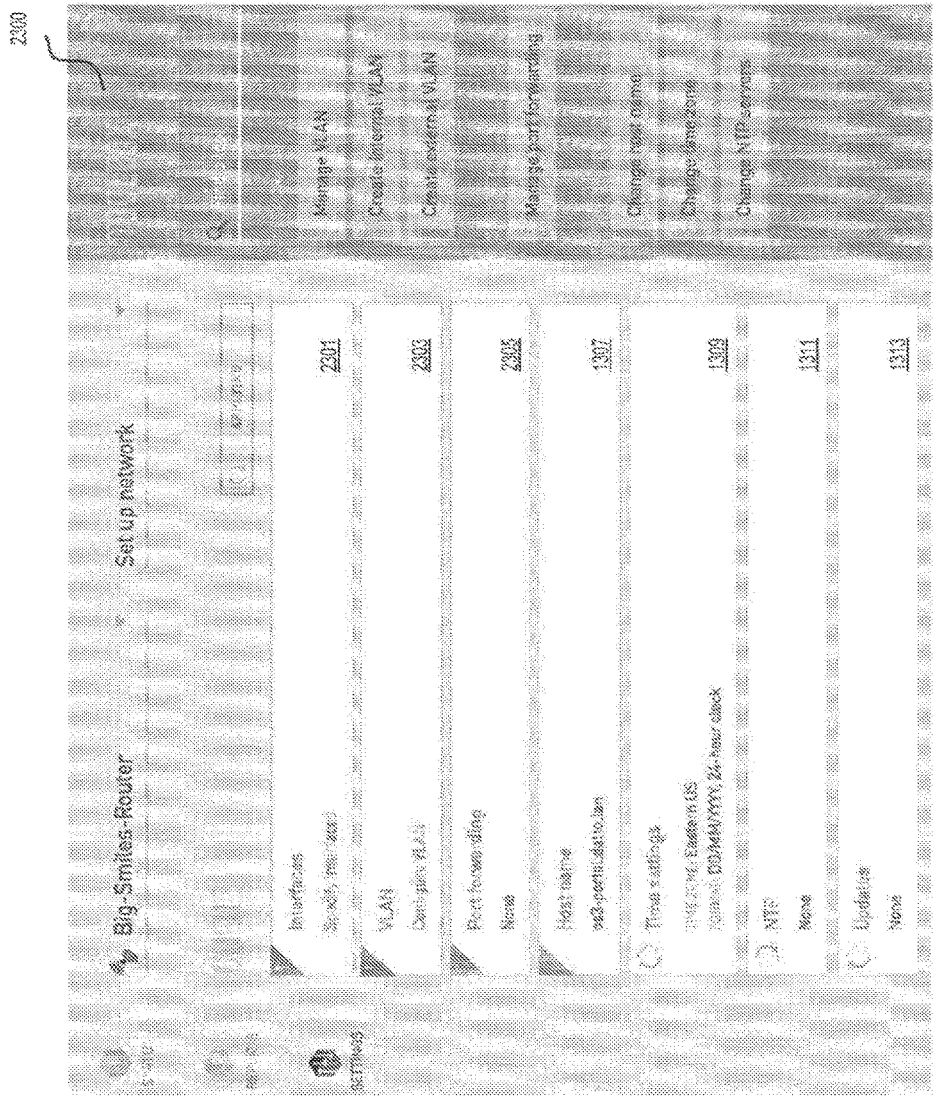
FIG. 23 shows an example of a MSP user interface for an assisted configuration of a local area network in a web-enabled router
Figure 24:
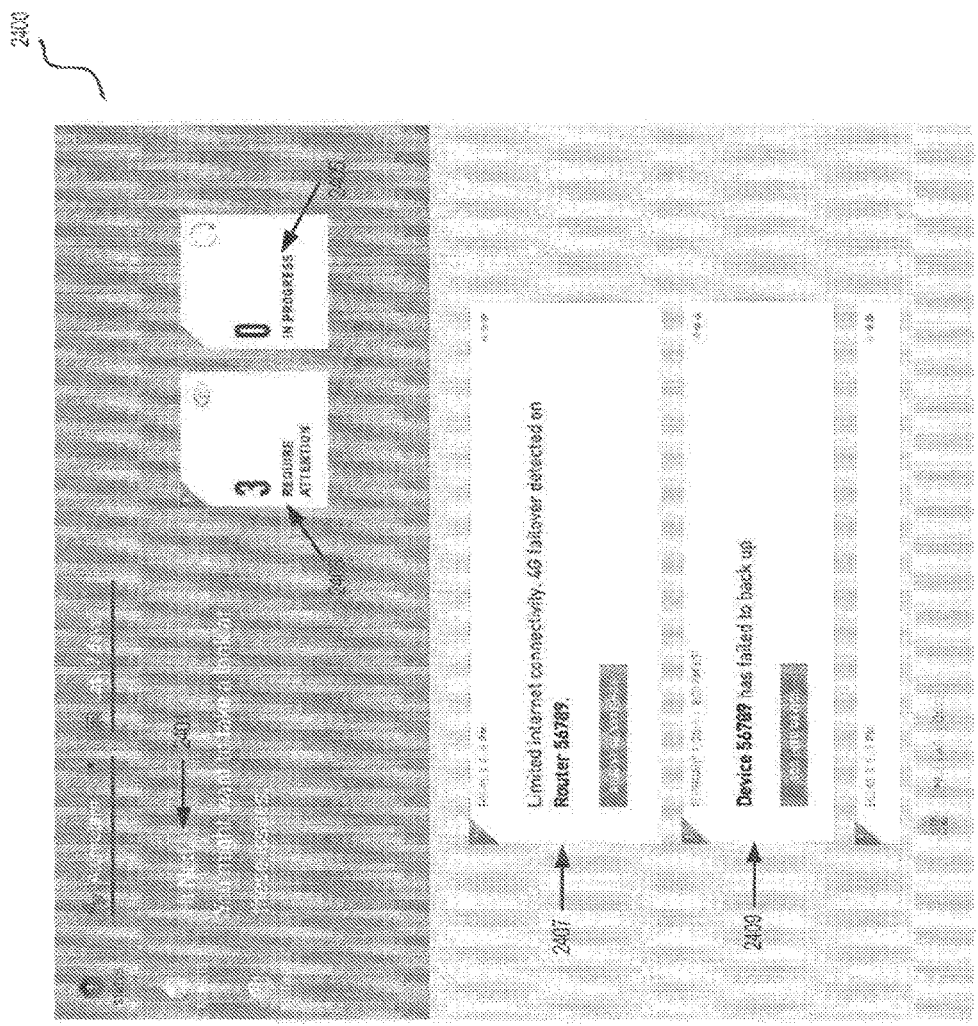
FIG. 24 shows an example of a MSP user interface for the monitoring and management of a fleet of web-enabled routers.
Figure 25:
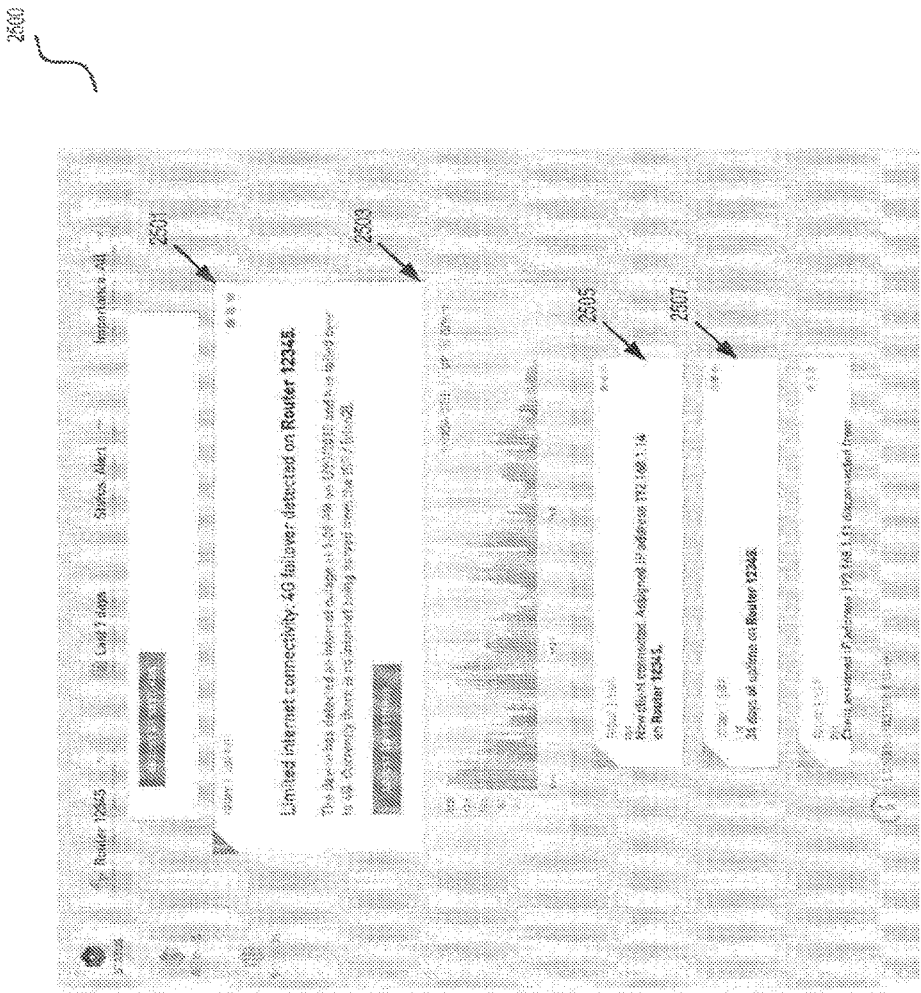
FIG. 25 shows an example of a detailed view of the status of a web-enabled router within a fleet of devices managed by an MSP.
Figure 26:
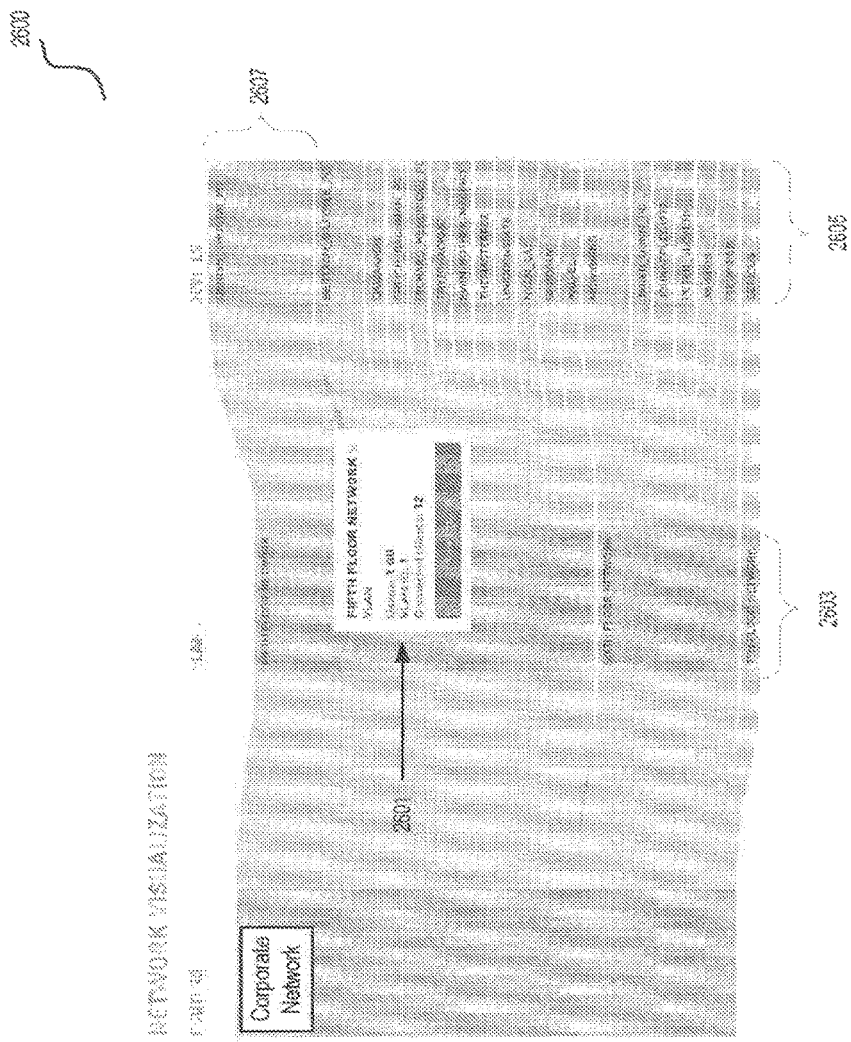
FIG. 26 shows an example of a real-time view of the bandwidth consumption of virtual networks and end-users connected to a web-enabled router

FIG. 18 shows an example of a user interface to configure a local area network of a web-enabled router via a smart template. FIG. 19 shows an example of a user interface showing the detection of a user input error during the configuration of a local area network in a web-enabled router. FIG. 20 shows an example of a user interface to configure wide area network Domain Name System settings in a web-enabled router via a smart template. FIG. 21 shows an example of a user interface to select a range of IF addresses for a Dynamic Host Configuration Protocol (DHCP) pool in a web-enabled router. FIG. 22 shows an example of a user interface to set a message with terms of service to be displayed on client devices connected to a guest network of the web-enabled router. FIG. 23 shows an example of a MSP user interface for an assisted configuration of a local area network in a web-enabled router FIG. 24 shows an example of a MSP user interface for the monitoring and management of a fleet of web-enabled routers. FIG. 25 shows an example of a detailed view of the status of a web-enabled router within a fleet of devices managed by an MSP. FIG. 26 shows an example of a real-time view of the bandwidth consumption of virtual networks and end-users connected to a web-enabled router.

Figure 27:
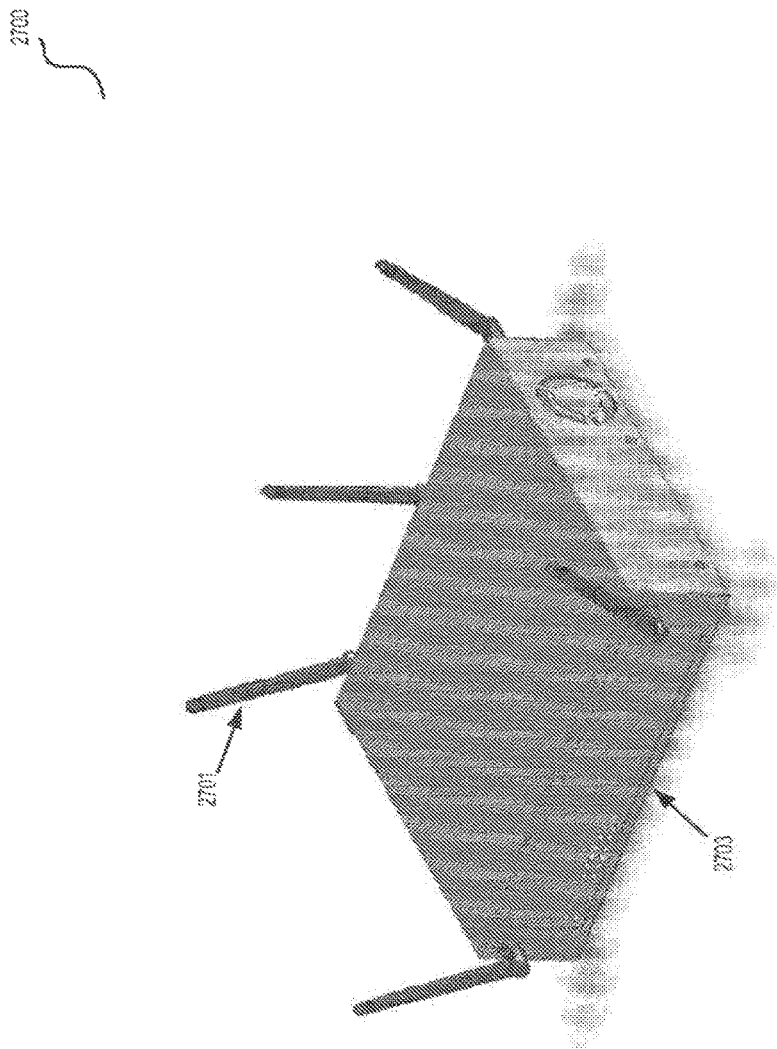
FIG. 27 shows an example of a chassis and antennas of a web-enabled router.

FIG. 27 shows an example of a chassis and antennas of a web-enabled router. In some implementation the router 200 can include for example, Axiomtek SBC8A361, an LTE Module for example, Telit LN930 with backup option of Sequans VZ22M, WiFi Module for example Compex WLE350NX-7B, a RAM(1×) for example Transcend TS8D30AX31LNE1, Compact Mash Memory for example Transcend TS32GCF170. LTE Cables for example CB1.17LL-IPX4L-SAF3GT, WiFi Cables for example CB1.37-IPX-SARF3GT, a PCTel MHWS6982700SMA, WiFi Antennas for example ZDA ZDAEW2459-5 and a Power Supply for example FSP Group FSP060-DIBAN2.

Figure 28:
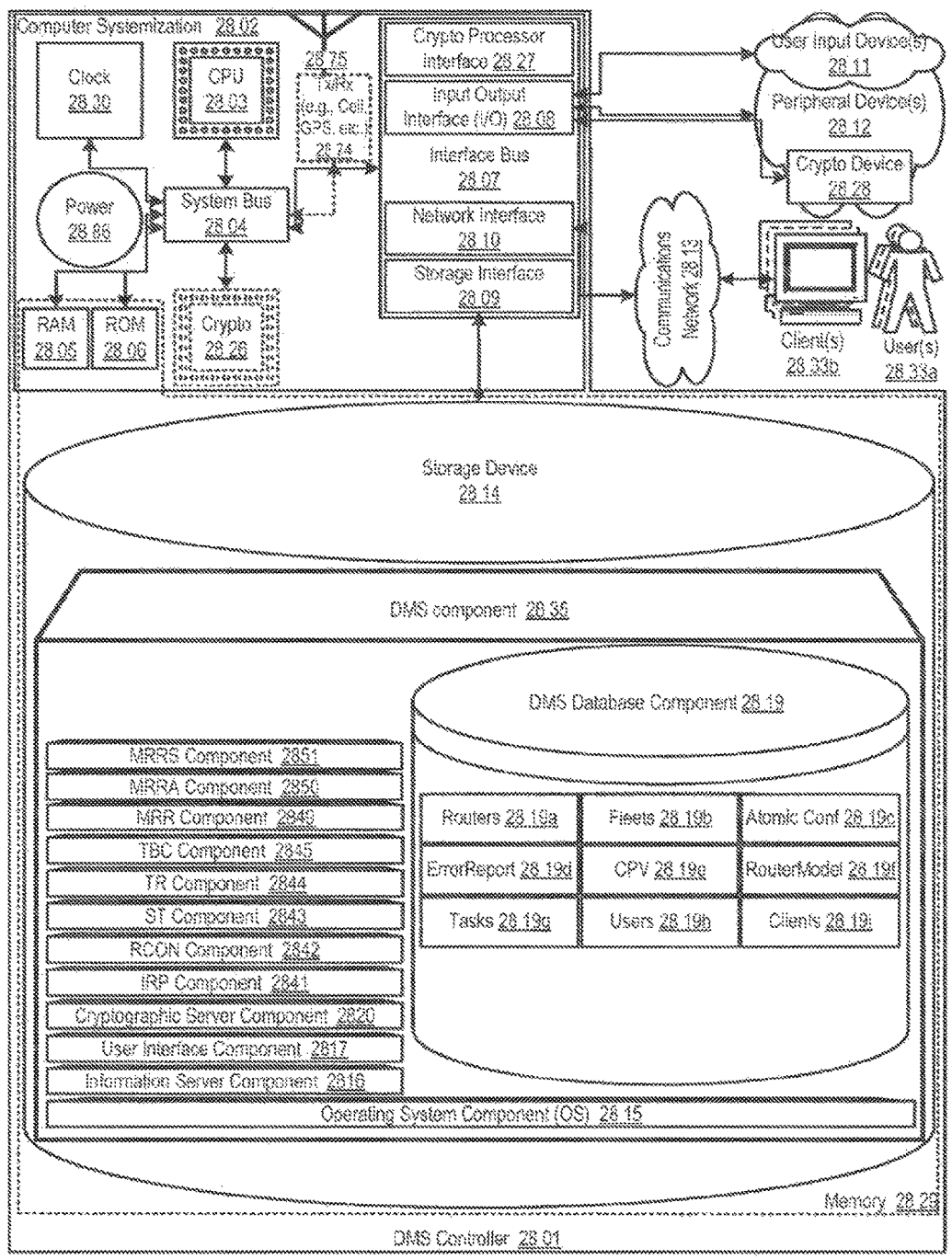
FIG. 28 shows an example block diagram illustrating aspects of an embodiment of a Web-enabled Router Management System DMS.

FIG. 28 shows an example block diagram illustrating aspects of an embodiment of a DMS server controller.

DMS Controller

FIG. 28 shows a block diagram illustrating embodiments of a DMS controller. In this embodiment, the DMS controller 2801 may serve to aggregate, process, store, search, serve, identify, instruct, generate, match, and/or facilitate interactions with a computer through various technologies, and/or other related data. The HCRS can, for example, be configured such that the various components described herein execute on the user configuration interface 110, the router 102, the router management server 128, the Aux-Server 314 and/or other aforementioned devices. Because each component of the ECRS may be distributed, as described below, the devices specified in this disclosure may perform portions of the program logic assigned to them or portions of the program logic normally assigned to another device. In another example, one or more of the components including the IRP Component 941, the RCON Component 942, the ST Component 943, and the TR Component 944 (described above with respect to FIG. 4-7) can execute on one or more routers for example 102, 204, 206, 326, 328, and/or 234. Alternatively or additionally one or more components including the IRP Component 941, the RCON Component 942, the ST Component 943, and the TR Component 944 (described above with respect to FIG. 4-7) can execute on one or more servers including the router management servers 128 and 228, and AuxServer 314 providing services to one or more devices via the networked program execution capabilities described below.

Typically, users, which may be people and/or other systems, may engage information technology systems (e.g., computers) to facilitate information processing. In turn, computers employ processors to process information; such processors 2803 may be referred to as central processing units (CPU). One form of processor is referred to as a microprocessor. CPUs use communicative, circuits to pass binary encoded signals acting as instructions to enable various opera lions. These instructions may be operational and/or data instructions containing and/or referencing other instructions and data in various processor accessible and operable areas of memory 2829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DMS controller 2801 may be connected to and/or communicate with entities such as, but not limited to: one or more users from user input devices 2811; peripheral devices 2812; an optional cryptographic processor device 2828; and/or a communications network 2813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with Furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DMS controller 2801 may be based on computer systems that may comprise, but are not limited to, components such as: a computer systemization 2802 connected to memory 2829.

Computer Systemization

A computer systemization 2802 may comprise a clock 2830, central processing unit ("CPU(s)" and/or "processor(s)" (these terms are used interchangeable throughout the disclosure unless noted to the contrary)) 2803, a memory 2829 (e.g., a read only memory (ROM) 2806, a random access memory (RAM) 2805, etc.), and/or an interface bus 2807, and most frequently, although not necessarily, are alt interconnected and/or communicating through a system bus 2804 on one or more (mother)board(s) 2802 having conductive and/or otherwise transportive circuit pathways through which instructions (e.g., binary encoded signals) may travel to effectuate communications, operations, storage, etc. The computer systemization may be connected to a power source 2886; e.g., optionally the power source may be internal. Optionally, a cryptographic processor 2826 and/or transceivers (e.g., ICs) 2874 may be connected to the system bus. In another embodiment, the cryptographic processor and/or transceivers may be connected as either internal and/or external peripheral devices 2812 via the interface bus I/O. In turn, the transceivers may be connected to antenna(s) 2875, thereby effectuating wireless transmission and reception of various communication and/or sensor protocols; for example the antenna(s) may connect to: a Texas Instruments WiLink WL1283 transceiver chip (e.g., providing 902.11n, Bluetooth 3.0, FM, global positioning system (GPS) (thereby allowing DMS controller to determine its location)); Broadcom BCM4329FKUBG transceiver chip (e.g., providing 902.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system dock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to 3 specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale;

and/or the like processors). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DMS controller and beyond through various interfaces. Should processing requirements dictate a greater amount speed and/or capacity, distributed processors (e.g., Distributed DMS), mainframe, multi-core, parallel, and/or supercomputer architectures may similarly be employed. Alternatively, should deployment requirements dictate greater portability, smaller Personal Digital Assistants (PDAs) may be employed.

Depending on the particular implementation, features of the DMS may be achieved by implementing a microcontroller such as CAST'S R8051XC2 microcontroller; Intel's MCS 51 (i.e., 8051 microcontroller); and/or the like. Also, to implement certain features of the DMS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DMS component collection (distributed or otherwise) and/or features may be implemented via the microprocessor and/or via embedded components; e.g., via ASIC, coprocessor, DSP, FPGA, and/or the like. Alternately, some implementations of the DMS may be implemented with embedded components that are configured and used to achieve a variety of features or signal processing.

Depending on the particular implementation, the embedded components may include software solutions, hardware solutions, and/or some combination of both hardware/software solutions. For example, DMS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DMS features. A hierarchy of programmable interconnects allow logic blocks to be interconnected as needed by the DMS system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DMS may be developed on regular FPGAs and then migrated into a fixed version that more resembles ASIC implementations. Alternate or coordinating implementations may migrate DMS controller features to a final ASIC instead of or in addition to FPGAs. Deluding on the implementation all of the aforementioned embedded components and microprocessors may be considered the "CPU" and/or "processor" for the DMS.

Power Source

The power source 2886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2886 is connected to at least one of the interconnected subsequent components of the DMS thereby providing an electric current to all subsequent components. In one example, the power source 2886 is connected to the system bus component 2804. In an alternative embodiment, an outside power source 2886 is provided through a connection across the I/O 2808 interface. For example, a USB and/or IEEE 1394 connection carries both data and power across the connection and is therefore a suitable source of power.

Interface Adapters

Interface bus(ses) 2807 may accept, connect, and/or communicate to a number of interface adapters, conventionally although not necessarily in the form of adapter cards, such as but not limited to: input output interfaces (I/O) 2808, storage interfaces 2809, network interfaces 2810, and/or the like. Optionally, cryptographic processor interfaces 2827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2809 may accept, communicate, and/or connect to a number of storage devices such as, but not limited to: storage devices 2814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2810 may accept, communicate, and/or connect to a communications network 2813. Through a communications network 2813, the DMS controller is accessible through remote clients 2833b (e.g., computers with web browsers) by users 2833a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed DMS), architectures may similarly be employed to pool, load balance, and/or otherwise increase the communicative bandwidth required by the DMS controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection: a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2810 may be used to engage with various communications network types 2813. For example, multiple network interfaces may be employed to allow for the communication over broadcast, multicast, and/or unicast networks.

Input Output interfaces (I/O) 2808 may accept, communicate, and/or connect to user input devices 2811, peripheral devices 2812, cryptographic processor devices 2828, and/or the like. I/O may employ connection protocols such as, but not limited to: audio: analog, digital, monaural, RCA, stereo, and/or the like; data: Apple Desktop Bus (ADB). IEEE 1394a-b, serial, universal serial bus (USB): infrared; joystick; keyboard; midi; optical; PC AT; PS/2; parallel; radio; video interface: Apple Desktop Connector (ADC), BNC, coaxial, component, composite, digital. Digital Visual Interface (DVI), high-definition multimedia interface (HDMI), RCA, RF antennae, S-Video, VGA, and/or the like; wireless transceivers: 902.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or liquid Crystal Display (LCD) based monitor with an interlace (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVT display cable, etc.).

User input devices 2811 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2812 may be connected and/or communicate to I/O and/or other facilities of the like such as network interfaces, storage interfaces, directly to the interface bus, system bus, the CPU, and/or the like. Peripheral devices may be external, internal and/or part of the DMS controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 928), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DMS controller may be embodied as an embedded, dedicated, and/or monitor-less (i.e., headless) device, wherein access would be provided over a network interface connection.

Cryptographic units such as, but not limited to, microcontrollers, processors 2826, interfaces 2827, and/or devices 2828 may be attached, and/or communicate with the DMS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available, specialized cryptographic processors include: Broadcom's CryptoNetX and other Security Processors; nCiphers nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2829. However, memory is a fungible technology and resource, thus, any number of memory embodiments may be employed in lieu of or in concert with one another. It is to be understood that the DMS controller and/or a computer systemization may employ various forms of memory 2829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2829 will include ROM 2806, RAM 2805, and a storage device 2814. A storage device 2814 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2829 may contain a collection of program and/or database components and/or data such as, but not limited to: operating system component 2815; information server component 2816; user interface component 2817; DMS database component 2819; cryptographic server component 2820; IRP component 941; RCON component 942; ST component 943; TR component 944; and/or the like (i.e., collectively a component collection). The aforementioned components may be incorporated into (e.g., be sub-components of), loaded from, loaded by, or otherwise operatively available to and from the DMS component(s) 2835.

Any component may be stored and accessed from the storage devices and/or from storage devices accessible through an interface bus. Although program components such as those in the component collection, typically, are stored in a local storage device 2814, they may also be loaded and/or stored in other memory such as: remote "cloud" storage facilities accessible through a communications network; integrated ROM memory; via an FPGA or ASIC implementing component logic; and/or the like.

Operating System Component

The operating system component 2815 is an executable program component facilitating the operation of the DMS controller. Typically, the operating system facilitates access of I/O, network interfaces, peripheral devices, storage devices, and/or the like. The operating system may be a highly fault tolerant, scalable, and secure system such as: Unix and Unix-like system distributions (such as AT&T's UNIX; Berkley Software Distribution (BSD) variations such as FreeBSD, NetBSD, Open BSD, and/or the like; Linux distributions such as Red Hat, Debian, Ubuntu, and/or the like); and/or the like operating systems. However, more limited and/or less secure operating systems also may be employed such as Apple OS-X, Microsoft Windows 2000/ 2003/3.1/95/98/CE/Millenium/NT/Vista/XP/Win7 (Server), and/or the like. An operating system may communicate to and/or with other components in a component collection, including itself, and/or the like. Most frequently, the operating system communicates with other program components, user interfaces, and/or the like. The operating system, once executed by the CPU, may enable the interaction with communications networks, data, I/O, peripheral devices, program components, memory, user input devices, and/or the like. The operating system may provide communications protocols that allow the DMS controller to communicate with other entities through a communications network 2813, Various communication protocols may be used by the DMS controller as a subcarrier transport mechanism for interaction, such as, but not limited to: multicast, TCP/IP, UDP, unicast, and/or the like.

Information Server Component

An information server component 2816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), PLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FIT); HyperText Transfer Protocol (HTTP); Secure Hypertext Transfer Protocol (HTTPS), Secure Socket Layer (SSL), messaging protocols (e.g., ICQ, Internet Relay Chat (IRC), Presence and Instant Messaging Protocol (PRIM), Internet Engineering Task Force's (IETF's) Session Initiation Protocol (SIP). SIP for Instant Messaging and Presence leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Representational State Transfer (REST) and/or the like. The information server provides results in the form of Web pages to Web browsers, and allows for the manipulated generation of the Web pages through interaction with other program components. Alter a Domain Name System (DNS) resolution portion of an HTTP request is resolved to a particular information server, the information server resolves requests for information at specified locations on the DMS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DMS database component 2819, operating system component 2815, other program components, user interfaces, and/or the like.

Access from the Information Server Component 2816 to the DMS database component 2819 may be achieved through a number of database bridge mechanisms such as through scripting languages as enumerated below (e.g., CGI) and through inter-application communication channels as enumerated below (e.g., CORBA. WebObjects, etc.). Any data requests through a Web browser are parsed through the bridge mechanism into appropriate grammars as required by the DMS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DMS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser. Also, an information server may contain, communicate, generate, obtain, and/or provide program component, system, user, and/or data communications, requests, and/or responses.

User Interface Component

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows, web interface libraries such as, but not limited to, Dojo, jQuery UI, MooTools, Prototype, script.aculo.us, SWFObject, Yahoo! User Interface, any of which may be used and provide a baseline and means of accessing and displaying information graphically to users.

A user interface component 2817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, internet, and/or operate a computer system. A user interface may communicate to and/or with other components in a component collection, including itself, and/or facilities of the like. Most frequently, the user interface communicates with operating system component 2815, oilier program components, and/or the like. The user interface may contain, communicate, generate, obtain, and/or provide program component, system, user, and/or data communications, requests, and/or responses.

Cryptographic Server Component

A cryptographic server component 2820 is a stored program component that is executed by a CPU 2803, cryptographic processor 2826, cryptographic processor interface 2827, cryptographic processor device 2828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5), which is a one way hash operation), passwords, Rivest Cipher (RC5), Rijndael (AES), RSA, Secure Hash Algorithm (SHA), Secure Socket Layer (SSL), Secure Hypertext Transfer Protocol (HTTPS), and/or the like. Employing such encryption security protocols, the DMS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DMS component to engage in secure transactions if so desired. The cryptographic component facilitates the secure accessing of resources on the DMS and facilitates the access of secured resources on remote systems; i.e., it may act as a client and/or server of secured resources. Most frequently, the cryptographic component communicates with information server component 2816, operating system component 2815, other program components, and/or the like. The cryptographic component may contain, communicate, generate, obtain, and/or provide program component, system, user, and/or data communications, requests, and/or responses.

DMS Database Component

The DMS database component 2819 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DMS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or Integrated.

In one embodiment, the database component 2819 includes several tables 2819*a-i*. An Routers table 2819*a* may include fields such as, but not limited to: router_id, router_name, router_CPV, router_fleet, router_modelID, and/or the like. A Fleets table 2819*b* may include fields such as, but not limited to: fleet_id, fleet_name, Fleet_admin, fleet_description, and/or the like. An Atomic Configurations table 2819*c* may include fields such as, but not limited to: aconfig_id, aconfig_name, aconfig_description, aconfig_CPV, aconfig_ timestamp, and/or the like. An ErrorReport table 2819*d* may Include fields such as, but not limited to: errorReport_id, errorReport_name, errorReport_routerID, errorReport_fleetID, errorReport_content, and/or the like. A CPV table 2819*c* may include fields such as, but not limited to: CPV_id, CPV_routerID, CPV_fleetID, CPV_aconfigID, CPV_timeStamp, and/or the like. An RouterModel table 2819*f* may include fields such as, but not limited to: routerModel_id, routerModel_name, routerModel_manufacturer, routerModel_specs, routerModel_OS, and/or the like. An Tasks table 2819*g* may include fields such as, but not limited to: task_id, task_name, task_routerID, task_fleetID, task_execTime, task_script and/or the like. A Users table 2819*h* may include fields such as, but not limited to: user_id, first_name, last_name, devices_list, contact_info, contact_type, alt_contact_info, alt_contact_type, and/or the like. A Clients table 2819*i* may include fields such as, but not limited to: client_id, client_name, client_ip, client_type, client_model, operating_system, os_version, app_installed_flag, and/or the like. Any of the aforementioned tables may support and/or track multiple entities, accounts, users and/or the like.

In one embodiment, the DMS database component may interact with other database systems. For example, when employing a distributed database system. In such an embodiment, queries and data access by any DMS component may treat the combination of the DMS database component results and results from a second segment in a distributed database system as an integrated database layer. Such a database layer may be accessed as a single database entity, for example through DMS database component 2819, by any DMS component.

In an alternative or additional embodiment configuration profile variants can be stored in a structure substantially similar to a journaling file system's write journal which allows for the recovery of writes after a system's fault. In one embodiment, user programs may contain various user interface primitives, which may serve to update the DMS. Also, various accounts may require custom database tables depending upon the environments and the types of clients the DMS may need to serve. It should be noted that any unique fields may be designated as a key field throughout. In an alternative embodiment, these tables have been decentralized into their own databases and their respective database controllers (i.e. individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2819*a-i*. The DMS may be configured to keep track of various settings, inputs, and parameters via database controllers.

The DMS database may communicate to and/or with other components in a component collection, including itself, and/or facilities of the like. Most frequently, the DMS database communicates with the DMS component, other program components, and/or the like. The database may contain, retain, and provide information regarding other nodes and data.

DMS Component

The HCRS component 935 is a stored program component that is executed by a CPU. In one embodiment, the HCRS component incorporates any and/or all combinations of the aspects of the HCRS that was discussed in the previous figures. As such, the HCRS affects accessing, obtaining and the provision of information, services, transactions, and/or the like across various communications networks. The features and embodiments of the HCRS discussed herein increase network efficiency by reducing data transfer requirements the use of more efficient data structures and mechanisms for their transfer and storage. As a consequence, more data may be transferred in leas time, and latencies with regard to data processing operations and transactions, are also reduced. In many cases, such reduction in storage, transfer time, bandwidth requirements, latencies, etc., will reduce the capacity and structural infrastructure requirements to support the HCRS's features and facilities, and in many cases reduce the costs, energy consumption/requirements, and extend the life of HCRS's underlying infrastructure; this has the added benefit of making the HCRS more reliable. Similarly, many of the features and mechanisms are designed to be easier for users to use and access, thereby broadening the audience that may enjoy/employ and exploit the feature sets of the HCRS; such case of use also helps to increase the reliability of the HCRS. In addition, the feature sets include heightened security as noted via the Cryptographic components 920, 926, 928 and throughout, making access to the features and data more reliable and secure.

The HCRS component may transform a set of atomic configurations taken over numerous points in time, via various components described herein, into an instantiated configuration file built in a network traffic routing device. In one embodiment, the HCRS component 935 takes inputs (e.g., initiate configuration session 118, configuration profile variants request 120, CPV time frames request 125, hybrid profile installation 121, memory block for old profile 124 and 126, confirm installation 134, installation error report 137, check-in heartbeat 132, RCS response 139, ID processing request 208, connect new router 236, selection of atomic configurations 218, router configuration request 216, check-in heartbeat 226, CPV memory block response 220, task request 320, configuration request 310 and/or the like) etc., and transforms the inputs via various components (e.g., IRP component 941, RCON component 942, ST component 943, TR component 944, and/or the like), into outputs (e.g., CPV response 130, CPV time frames response 121, display CPVs 131, profile installation response 133, profile installation response 138, new router notification 230, ID processing response 226, CPV memory block request 218, task response 318, and/or the like).

The DMS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery; jQuery UI; MooTools; Prototype; script.aculo.us; Simple Object Access Protocol (SOAP); SWFObject; Yahoo! User Interface; and/or the like), WebObjects, and/or the like. In one embodiment, the DMS server employs a cryptographic server to encrypt and decrypt communications. The DMS component may communicate to and/or with other components in a component collection, including itself, and/or facilities of the like. Most frequently, the DMS component communicates with the DMS database component 2819, operating system component 2815, other program components, and/or the like. The DMS may contain, communicate, generate, obtain, and/or provide program component, system, user, and/or data communications, requests, and/or responses.

Distributed DMS Components

The structure and/or operation of any of the DMS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DMS controller will depend on the context of system deployment Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, Representational State Transfer (REST), process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

W3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file os processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. Further, the parsing grammar may be used beyond message parsing, but may also be used to parse: databases, data collections, data stores, structured data, and/or the like. Again, the desired configuration will depend upon the context, environment and requirements of system deployment.

Additional DMS Configurations

In order to address various issues and advance the art, the entirety of this application for DMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations-in-part, divisional applications, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DMS individual and/or enterprise user, database configuration and/or relational model, data type, data transmission and/or network framework, syntax structure, and/or the like, various embodiments of the DMS, may be implemented that enable a great deal of flexibility and customization as described herein.

The invention claimed is:

1. A system for providing remote secure centralized administration of a plurality of routers, the system comprising:
    at least one storage repository storing a plurality of router configuration profiles, each router configuration profile including a plurality of atomic settings, the plurality of router configuration profiles stored in the at least one storage repository comprising:
        a plurality of first configuration profile types for a first router associated with a first LAN to communicatively couple the first LAN to the Internet;
        for each first configuration profile type, a plurality of first configuration profile variants, wherein respective first configuration profile variants have at least one first different atomic setting;
        a plurality of second configuration profile types for a second router associated with a second LAN to communicatively couple the second LAN to the Internet; and
        for each second configuration profile type, a plurality of second configuration profile variants, wherein respective second configuration profile variants have at least one second different atomic setting; and
    a Device Management Server (DMS), comprising:
        at least one WAN communication interface to facilitate the transfer of data packets between the DMS and the Internet, the at least one WAN communication interface identified by a first web domain identifier associated with a first web domain that includes the DMS;
        a memory to storing processor-executable instructions; and
        a DMS processor communicatively coupled to the at least one WAN communication interface and the memory,
        wherein upon execution of the processor-executable instructions by the DMS processor, the DMS processor:
            A) electronically accesses at least some of the plurality of router configuration profiles stored in the at least one storage repository; and
            B) provides a web-accessible router configuration portal, via the first web domain identifier associated with the first web domain, to facilitate creation of at least a first hybrid configuration profile for the first router based at least in part on at least one of:
                first respective atomic settings of at least some of the plurality of first configuration profile variants; and
                second respective atomic setting of at least some of the plurality of second configuration profile variants.

2. The system of claim 1, wherein the DMS processor further:
    C) controls the at least one WAN communication interface to transmit to the first router first data packets representing the first hybrid configuration profile.

3. The system of claim 2, wherein the DMS processor further:
    D), after C), controls the at least one WAN communication interface to receive from the first router at least one first router heartbeat, wherein the first router heartbeat comprises second data packets representing a first router status.

4. The system of claim 3, wherein the DMS processor further:
    E) in response to the at least one first router heartbeat, controls the at least one WAN communication interface to transmit to the first router at least one third data packet representing at least one task for the router to execute.

5. The system of claim 4, wherein the at least one task for the router includes changing a time interval in which the router periodically transmits the at least one router heartbeat.

6. The system of claim 2, wherein the DMS processor further:
    D), after C), controls the at least one WAN communication interface to receive from the first router at least one data packet indicating an installation status of the first hybrid configuration profile.

7. The system of claim 1, wherein the plurality of first configuration profile types and the plurality of second configuration profile types comprise configuration profile types for different events or purposes.

8. The system of claim 7, wherein the different events or purposes include at least one of multiplayer gaming over a local area network, network-wide parental control, and connecting multiple devices from two or more local area networks wirelessly.

9. The system of claim 1, wherein:
    the plurality of first configuration profile variants comprise profile variants representing atomic settings installed on the first router at different instants in time; and
    the plurality of second configuration profile variants comprise profile variants representing atomic settings installed on the second router at different instants in time.

10. A method for providing remote secure centralized administration of a plurality of routers, the method comprising:
    storing, by at least one storage repository, a plurality of router configuration profiles, each router configuration profile including a plurality of atomic settings, the plurality of router configuration profiles stored in the at least one storage repository, wherein the at least one storage repository includes:
        a plurality of first configuration profile types for a first router associated with a first LAN to communicatively couple the first LAN to the Internet, for each first configuration profile type, a plurality of first configuration profile variants, wherein respective first configuration profile variants have at least one first different atomic setting, a plurality of second configuration profile types for a second router associated with a second LAN to communicatively couple the second LAN to the Internet, and for each second configuration profile type, a plurality of second configuration profile variants, wherein respective second configuration profile variants have at least one second different atomic setting; and providing a Device Management Server (DMS), wherein the DMS includes:

at least one WAN communication interface to facilitate the transfer of data packets between the DMS and the Internet, the at least one WAN communication interface identified by a first web domain identifier associated with a first web domain that includes the DMS, a memory to storing processor-executable instructions, and a DMS processor communicatively coupled to the at least one WAN communication interface and the memory;

executing, by the DMS processor, the processor-executable instructions;

accessing, by the DMS processor, at least some of the plurality of router configuration profiles stored in the at least one storage repository; and providing, by the DMS processor, a web-accessible router configuration portal, via the first web domain identifier associated with the first web domain, to facilitate creation of at least a first hybrid configuration profile for the first router based at least in part on at least one of:

first respective atomic settings of at least some of the plurality of first configuration profile variants, and second respective atomic setting of at least some of the plurality of second configuration profile variants.

11. The method of claim 10, further comprising:
controlling, by the DMS processor, the at least one WAN communication interface to transmit to the first router first data packets representing the first hybrid configuration profile.

12. The method of claim 11, further comprising:
controlling, by the DMS processor, the at least one WAN communication interface to receive from the first router at least one first router heartbeat, wherein the first router heartbeat comprises second data packets representing a first router status.

13. The method of claim 12, further comprising:
controlling, by the DMS processor, in response to the at least one first router heartbeat, the at least one WAN communication interface to transmit to the first router at least one third data packet representing at least one task for the router to execute.

14. The method of claim 13, wherein the at least one task for the router includes changing a time interval in which the router periodically transmits the at least one router heartbeat.

15. The method of claim 11, further comprising:
controlling, by the DMS processor, the at least one WAN communication interface to receive from the first router at least one data packet indicating an installation status of the first hybrid configuration profile.

16. The method of claim 10, wherein the plurality of first configuration profile types and the plurality of second configuration profile types comprise configuration profile types for different events or purposes.

17. The method of claim 16, wherein the different events or purposes include at least one of multiplayer gaming over a local area network, network-wide parental control, and connecting multiple devices from two or more local area networks wirelessly.

18. The method of claim 10, wherein:
the plurality of first configuration profile variants comprise profile variants representing atomic settings installed on the first router at different instants in time; and the plurality of second configuration profile variants comprise profile variants representing atomic settings installed on the second router at different instants in time.

* * * * *